United States Patent
Yenumulapalli et al.

(10) Patent No.: US 10,924,370 B2
(45) Date of Patent: Feb. 16, 2021

(54) MONITORING CLOUD-BASED SERVICES AND/OR FEATURES

(71) Applicant: Verizon Patent and Licensing Inc., Arlington, VA (US)

(72) Inventors: Harish Yenumulapalli, Atlanta, GA (US); Srinivas S. Halembar, Alpharetta, GA (US); Prashanth Peddabbu, Atlanta, GA (US); Bhuvana Lalitha Namasivayam, Cumming, GA (US); Lakshmi N. Chakarapani, Sandy Springs, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 142 days.

(21) Appl. No.: 16/155,000

(22) Filed: Oct. 9, 2018

(65) Prior Publication Data
US 2020/0112497 A1   Apr. 9, 2020

(51) Int. Cl.
*H04L 12/26* (2006.01)
*H04L 29/08* (2006.01)
*H04L 12/58* (2006.01)

(52) U.S. Cl.
CPC .......... *H04L 43/0817* (2013.01); *H04L 43/10* (2013.01); *H04L 51/18* (2013.01); *H04L 67/10* (2013.01); *H04L 67/16* (2013.01)

(58) Field of Classification Search
CPC ..... H04L 43/0817; H04L 43/10; H04L 51/18; H04L 67/10; H04L 67/16

USPC .......................................................... 709/206
See application file for complete search history.

(56) References Cited

U.S. PATENT DOCUMENTS

| | | | |
|---|---|---|---|
| 9,503,530 B1* | 11/2016 | Niedzielski | H04L 67/1034 |
| 2013/0325899 A1* | 12/2013 | Mohaban | G06F 16/148 |
| | | | 707/791 |
| 2014/0089826 A1* | 3/2014 | Boyd | G11B 27/031 |
| | | | 715/765 |
| 2016/0103883 A1* | 4/2016 | Ramani | G06F 16/24573 |
| | | | 707/725 |
| 2019/0199611 A1* | 6/2019 | Kotadia | H04L 43/16 |
| 2019/0286598 A1* | 9/2019 | Chivetta | H04L 67/06 |
| 2020/0014602 A1* | 1/2020 | Le Mouel | H04L 43/16 |

* cited by examiner

*Primary Examiner* — Kevin T Bates
*Assistant Examiner* — Chen-Liang Huang

(57) ABSTRACT

A microservice monitoring platform can determine a service health status for a microservice based on a service type associated with the microservice. The microservice can be hosted in a first cloud computing environment by a first data center. The microservice monitoring platform can determine a feature health status for a cloud-based feature based on the service health status for the microservice, wherein the cloud-based feature is hosted in the first cloud computing environment by the first data center and uses the microservice. The microservice monitoring platform can transmit, based on the feature health status, an instruction to route a service request, associated with the cloud-based feature, to one of the first data center or a second data center that hosts the cloud-based feature in a second cloud computing environment.

20 Claims, 20 Drawing Sheets

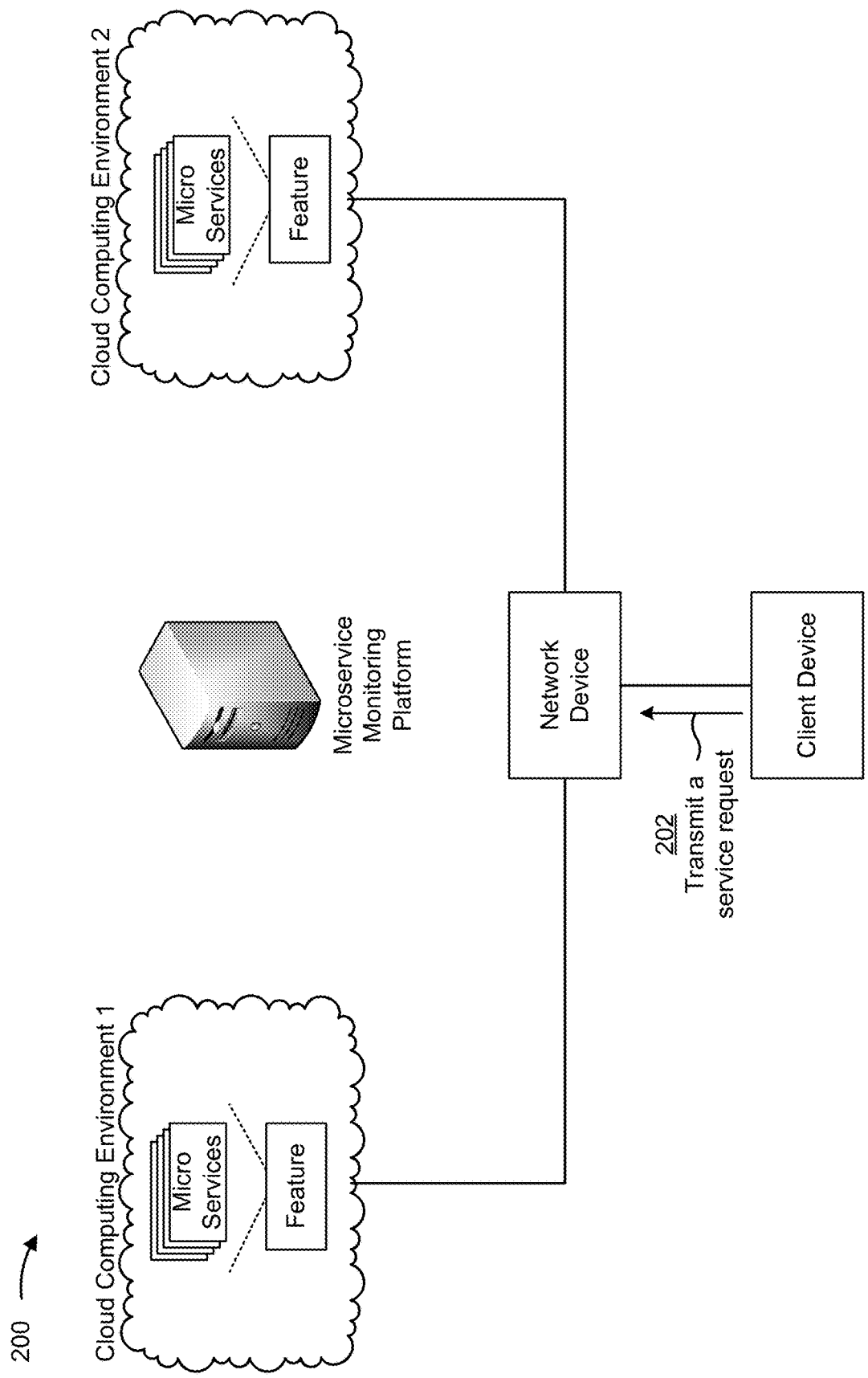

US 10,924,370 B2

MONITORING CLOUD-BASED SERVICES AND/OR FEATURES

BACKGROUND

A microservice can include a software element that can offer a service, a function, and/or the like; and can be modular and independently deployable. In some cases, one or more microservices can be packaged together in a loosely coupled manner to provide a software application, a software feature, and/or the like.

BRIEF DESCRIPTION OF THE DRAWINGS

FIGS. 2A-2C are diagrams of another example implementation described herein.

DETAILED DESCRIPTION OF PREFERRED EMBODIMENTS

Figure 1A:
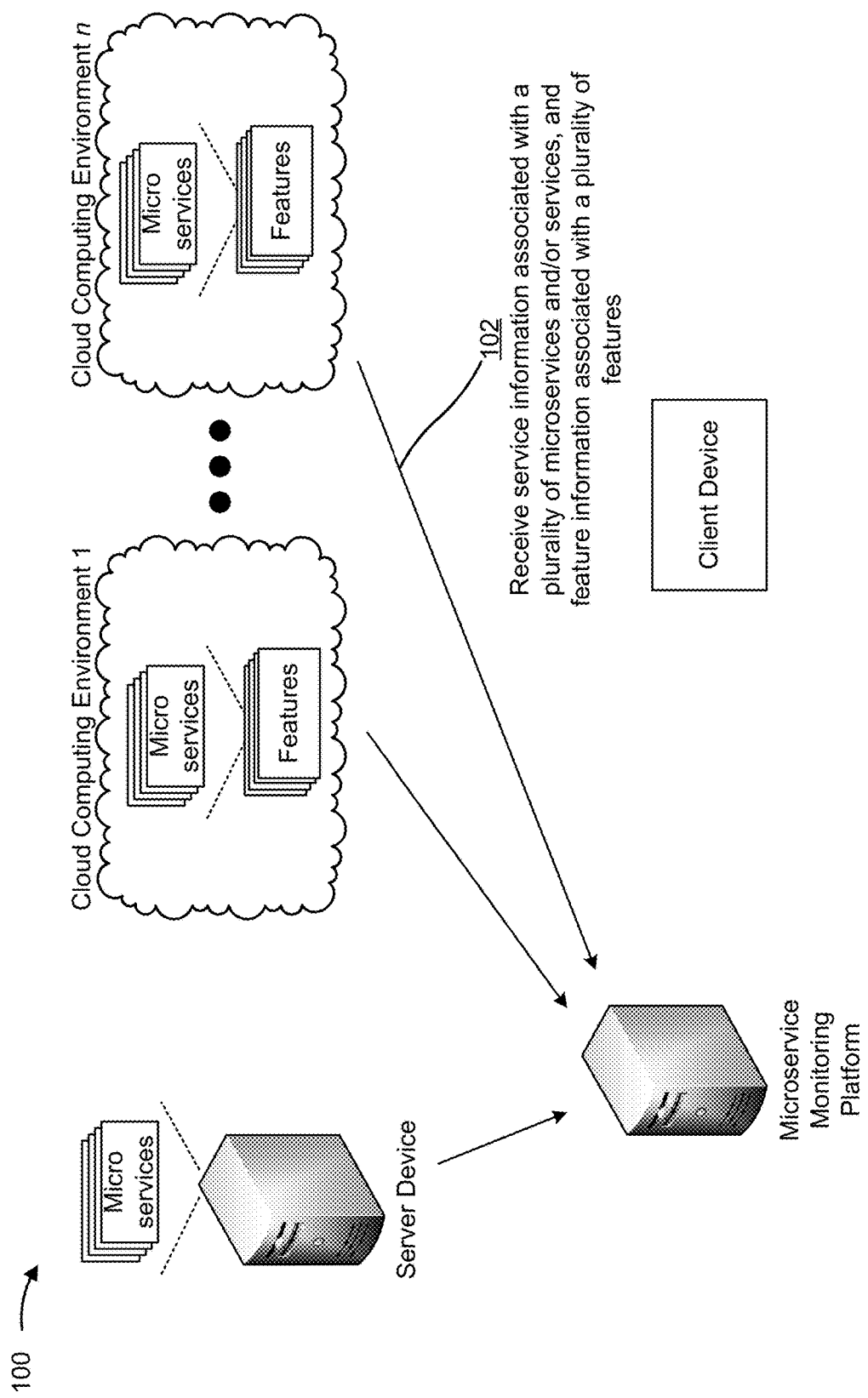
FIGS. 1A-1C are diagrams of an example implementation described herein.

The following detailed description of example implementations refers to the accompanying drawings. The same reference numbers in different drawings can identify the same or similar elements.

In some cases, the quantity of microservices and/or cloud-based features being deployed is rapidly rising. Monolithic software applications are being converted to hundreds and/or thousands of microservices and/or cloud-based features, which can be distributed across a plurality of cloud computing environments in a plurality of geographically dispersed data centers. In addition, each microservice and/or cloud-based feature can depend on a plurality of microservices, which in turn can each depend on a plurality of other microservices. As a result, it can be challenging to monitor, manage, and/or troubleshoot the ever-increasing quantity and complexity of microservices and/or cloud-based features.

Some implementations described herein provide a microservice monitoring platform that is capable of monitoring service health statuses of a plurality of microservices and/or services, that is capable of monitoring feature health statuses of a plurality of cloud-based features, and/or the like. In this way, the microservice monitoring platform can provide health monitoring for various types of microservices and/or services (e.g., for microservices associated with an internal service type, for microservices associated with an external service type, for microservices associated with a resource service type, and/or the like), which increases the capability of the microservice monitoring platform to monitor, track, troubleshoot, and/or manage the microservices and/or services. Moreover, in this way, the microservice monitoring platform can provide health monitoring for microservices and/or cloud-based features across a plurality of cloud computing environments, which allows the microservice monitoring platform to provide a cloud-based feature using microservices in different cloud computing environments based on the service health statuses of the microservices and/or services in the different cloud computing environments, which allows the microservice monitoring platform to configure the routing of service requests for a particular cloud-based feature based on the feature health statues, for the cloud-based feature, in the different cloud computing environments, which increases the flexibility in providing the cloud-based feature, increases the availability and reliability of the cloud-based feature, and/or the like.

In addition, the microservice monitoring platform can determine a service health status for a microservice, a service, and/or a feature health status for a cloud-based feature based on a plurality of factors, which increases the accuracy of the feature health status determination. Moreover, the microservice monitoring platform is capable of integrating the monitoring of resource services associated with a resource service type, which increases the ability of the microservice monitoring platform to monitor resource services that are used by other microservices in the cloud computing environments. Furthermore, the microservice monitoring platform is capable of being deployed in the cloud computing environments as a microservice, is capable of being deployed as a standalone device, and/or the like, which increases the flexibility of deploying the microservice monitoring platform.

Figure 1B:
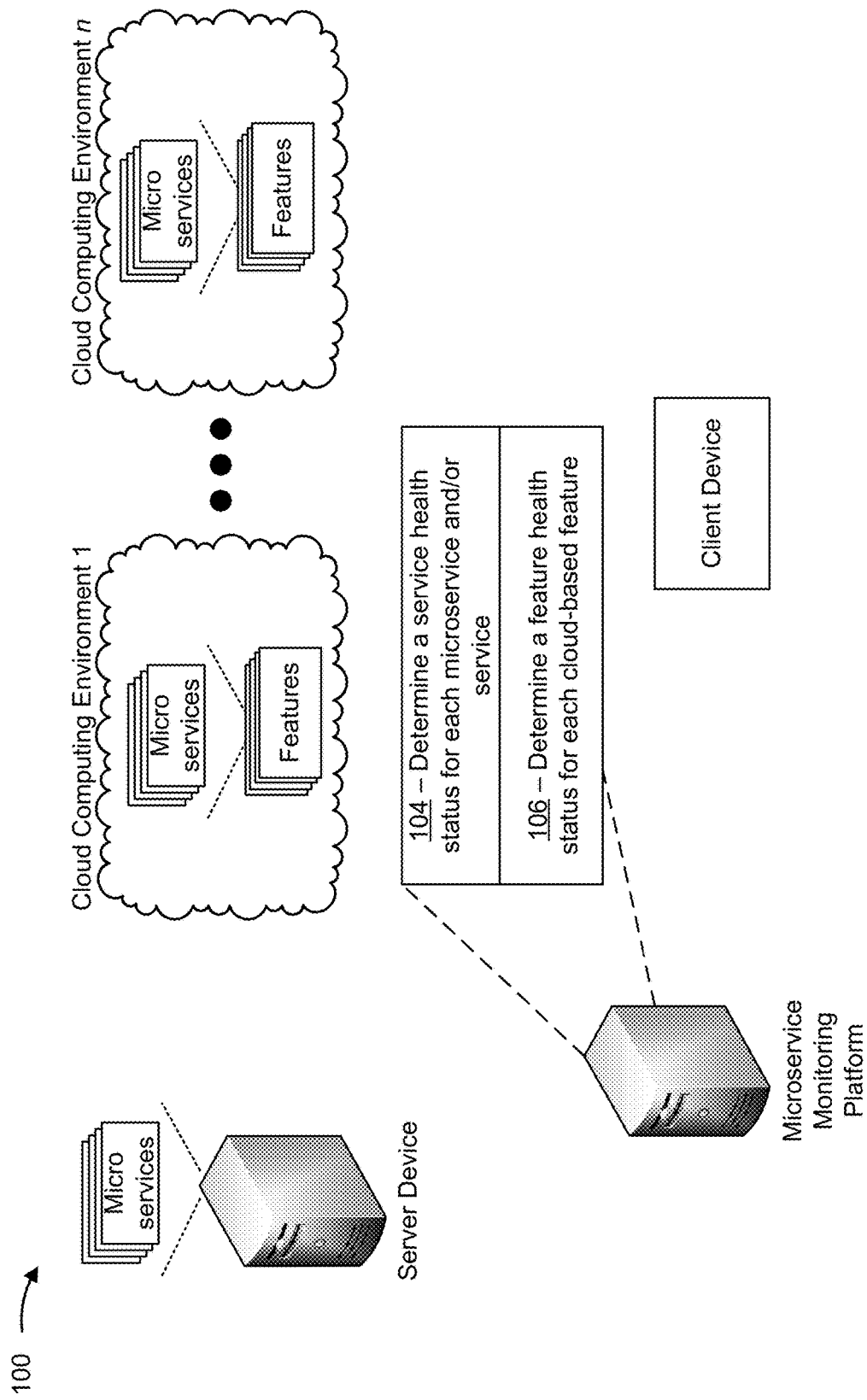
Figure 1C:
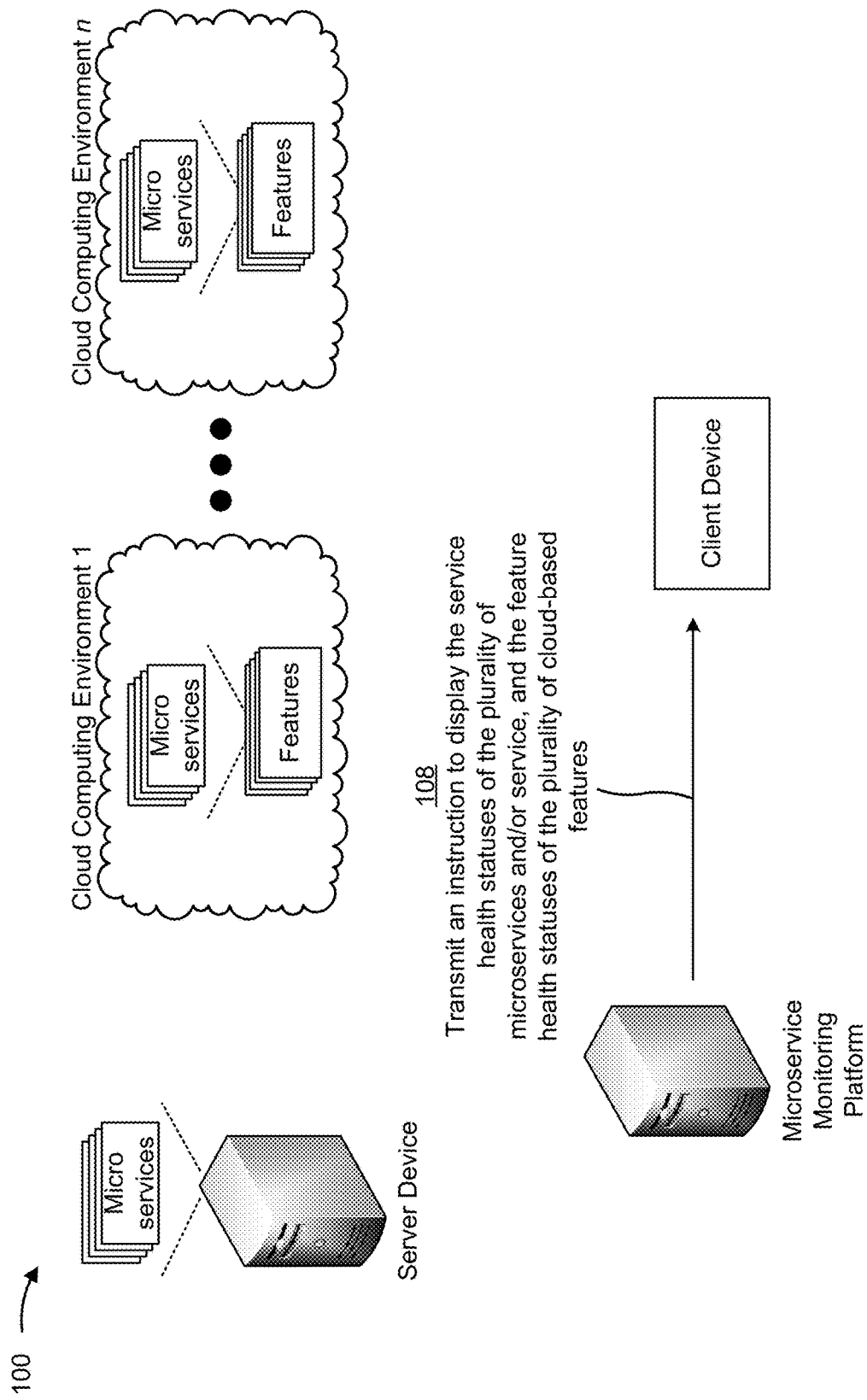

FIGS. 1A-1C are diagrams of an example implementation 100 described herein. As shown in FIGS. 1A-1C, implementation 100 can include a plurality of cloud computing environments (e.g., cloud computing environment 1 through cloud computing environment n, collectively referred to as "cloud computing environments" and individually as "cloud computing environment"), a client device, a service monitoring platform, and/or the like. The quantity and arrangement of components illustrated in implementation 100 is an example, and greater and/or fewer components can be included in implementation 100.

A cloud computing environment can include one or more computing resources that provide, host, and/or implement the cloud computing environment. A cloud computing environment can host and/or provide one or more microservices, one or more cloud-based features, and/or the like. A cloud computing environment can be implemented in a server device, in a data center, and/or the like. In some implementations, a first cloud computing environment can be hosted in a data center in a first geographic region, a second cloud computing environment can be hosted in a data center in a second geographic region, and so on. In this way, if the same microservice and/or cloud-based feature is hosted in each of the cloud computing environments, the microservice and/or cloud-based feature can be hosted in different geographic regions so that usage of the microservice and/or cloud-based feature can be distributed among the cloud computing environments, which reduces latency in providing the microservice and/or cloud-based feature (e.g., by reducing service request queues in each cloud computing environment, by routing a service request to the nearest cloud computing environment, and/or the like), improves reliability and availability of the microservice and/or cloud-based feature (e.g., if a microservice and/or cloud-based feature becomes unavailable in a first cloud computing environment, service requests associated with the microservice and/or cloud-based feature can be processed using a second cloud computing environment that hosts the microservice and/or cloud-based feature), and/or the like.

As explained above, a microservice can include a software element that can offer a service, and can be modular and independently deployable relative to other microservices. Examples of microservices can include an identity management microservice (e.g., a microservice that manages the identity of one or more users), an account management microservice (e.g., a microservice that manages accounts of one or more users), a point of interest microservice (e.g., a microservice that tracks, maintains, and/or provides points of interest), and/or the like.

In some implementations, a microservice can be associated with a service type of a plurality of service types. For example, the plurality of service types can include an internal microservice type, an external microservice type, a resource service type, and/or the like. The internal microservice type can include one or more microservices that are hosted in a particular cloud computing environment, hosted and/or offered by a particular entity (e.g., an organization, a corporation, and/or the like), and/or the like. An external microservice type can include one or more microservices that are hosted outside of a particular cloud computing environment (e.g., hosted by another cloud computing environment, hosted by a server device, and/or the like), hosted and/or offered by another entity, and/or the like. A resource service type can include one or more resource services that are used by a cloud computing environment to provide one or more microservices, that are used by the service monitoring platform to monitor the one or more microservices, used by a cloud computing environment and/or the service monitoring platform to maintain the one or more microservices, and/or the like. Examples of resource services that can be associated with the resource service type include a database service (e.g., that is used to store information associated with the one or more other microservices), a messaging service (e.g., that is used to communicate with, and between, the one or more other microservices), and/or the like.

A cloud-based feature can include one or more software elements that provide a user-accessible function. Examples of cloud-based features include a remote vehicle door lock/unlock feature, a vehicle location history feature, a stolen vehicle tracking feature, an emergency calling feature, and/or the like. A user can use the client device to transmit a service request (e.g., a stolen vehicle tracking inquiry, a request for information identifying one or more points of interest, and/or the like) to a cloud computing environment, and the cloud computing environment can identify a cloud-based feature, hosted by the cloud computing environment, that is associated with the service request, and can process the service request using the cloud-based feature. In some implementations, one or more microservices can be used to provide a cloud-based feature. For example, an identity management microservice, an account management microservice, a mapping microservice, and/or the like, can be used to provide a vehicle location history feature.

The microservice monitoring platform can monitor one or more microservices hosted by the cloud computing environments (e.g., internal microservices), can monitor one or more microservices hosted external to the cloud computing environments (e.g., external microservices), can monitor one or more microservices that are used by the cloud computing environments and/or the service monitoring platform (e.g., resource services), can monitor one or more features provided by the cloud computing environments, and/or the like. In some implementations, the microservice monitoring platform can monitor a microservice and/or feature to identify an issue with the microservice and/or feature, to identify a root cause of the issues, to identify and/or perform a recovery action to address the issue, and/or the like.

In some implementations, the microservice monitoring platform can provide, to the client device, an instruction to display information associated with one or more microservices, information associated with one or more cloud-based features, information associated with one or more cloud computing environments, and/or the like. The client device can receive the instruction and can display the information in a graphical user interface (GUI). In some implementations, the information associated with a microservice can include a health status of the microservice (e.g., an indicator that the microservice is available or up, an indicator that the microservice is unavailable or down, an indicator that the microservice is experiencing issues or a warning, and/or the like), can include one or more metrics that the service monitoring platform can use to determine the health status of the microservice (e.g., latency associated with the microservice, availability of the microservice, error rates associated with the microservice, and/or the like), can include information identifying one or more dependent microservices associated with the microservice (e.g., one or more other microservices that are used by the microservice), health statues of the one or more dependent microservices, and/or the like.

In some implementations, the information associated with a cloud-based feature can include a health status of the cloud-based feature (e.g., an indicator that the cloud-based feature is available or up, an indicator that the cloud-based feature is unavailable or down, an indicator that the cloud-based feature is experiencing issues or a warning, and/or the like), can include information identifying one or more microservices associated with the cloud-based feature (e.g., one or more microservices that are used to provide the cloud-based feature), health statues of the one or more microservices, and/or the like.

In some implementations, the information associated with the one or more microservices and/or the information associated with the one or more cloud-based features can be displayed, in the GUI, on a cloud computing environment basis. For example, one or more microservices hosted in a first cloud computing environment can be displayed in a first GUI view, one or more microservices hosted in a second cloud computing environment can be displayed in a second GUI view, and so on. Similarly, one or more cloud-based features provided by a first cloud computing environment can be displayed in a first GUI view, one or more cloud-based features provided by a second cloud computing environment can be displayed in a second GUI view, and so on. In some implementations, microservice monitoring platform can transmit, to the client device, an instruction to display an overall health status for a cloud computing environment (e.g., an indicator that the cloud computing environment is available or up, an indicator that the cloud computing environment is unavailable or down, an indicator that the cloud computing environment is experiencing issues or a warning, and/or the like).

Turning to FIG. 1A, and as shown by reference number 102, to monitor microservices and/or cloud-based features, the service monitoring platform can receive service information associated with a plurality of microservices and/or services, and can receive feature information associated with a plurality of cloud-based features, and/or the like. In some implementations, the plurality of microservices and/or services can include one or more internal microservices that are hosted in an internal cloud computing environment (e.g., at least one of cloud computing environment 1 through cloud computing environment n), one or more external microservices that are hosted in an external cloud computing environment and/or hosted on an external server device, one or more resource services that are hosed in the internal cloud computing environment, the external cloud computing environment, and/or the external server device, and/or the like.

In some implementations, the microservice monitoring platform can receive the service information and/or the feature information at particular time intervals (e.g., every minute, every five minutes, and/or the like), can receive the service information and/or the feature information based on the occurrence of an event (e.g., based on a new microservice becoming available, based on the microservice monitoring platform providing a request, and/or the like), and/or the like.

In some implementations, the information associated with a microservice, of the plurality of microservices and/or services, can include information identifying the microservice, information identifying one or more microservice metrics associated with the microservice, one or more thresholds associated with the one or more microservice metrics, performance data associated with the microservice, information identifying one or more dependent microservices that are used by the microservice, and/or the like. In some implementations, the information identifying the microservice can include a name of the microservice, a location of the microservice (e.g., information identifying the cloud computing environment in which the microservice is hosted, information identifying the data center in which the cloud computing environment is implemented, information identifying a region in which the data center is located, and/or the like), an address associated with the microservice (e.g., a uniform resource identifier (URI) associated with the microservice, an Internet protocol (IP) address associated with the microservice, and/or the like), a port identifier associated with the microservice (e.g., a port number associated with the microservice, a port name associated with the microservice, and/or the like), and/or the like.

In some implementations, the one or more microservice metrics can include a latency metric (e.g., a metric that is associated with an amount of time it takes the microservice to process a service request), an availability metric (e.g., a metric that is associated with a percentage of a time period that the microservice is available to process service requests), an error rate metric (e.g., a metric that is associated with a percentage and/or quantity of errors that the microservice experiences in a time period), and/or the like. In some implementations, the one or more microservice metrics associated with the microservice, and the one or more thresholds associated with the one or more microservice metrics, can be determined by an operator of the cloud computing environment, can be determined based on a service level agreement (SLA), can be determined based on one or more performance parameters of a cloud-based feature that used the microservice, and/or the like.

In some implementations, the information associated with a cloud-based feature, of the plurality of cloud-based features, can include information such as information identifying one or more feature metrics associated with the cloud-based feature, one or more thresholds associated with the one or more feature metrics, performance data associated with the cloud-based feature, information identifying one or more microservices that are used to provide the cloud-based feature, and/or the like. In some implementations, the information identifying the cloud-based feature can include a name of the cloud-based feature, a location of the cloud-based feature (e.g., information identifying the cloud computing environment in which the cloud-based feature is hosted, information identifying the data center in which the cloud computing environment is implemented, information identifying a region in which the data center is located, and/or the like), an address associated with the cloud-based feature (e.g., a URI associated with the cloud-based feature, an IP address associated with the cloud-based feature, and/or the like), a port identifier associated with the cloud-based feature (e.g., a port number associated with the cloud-based feature, a port name associated with the cloud-based feature, and/or the like), and/or the like. In some implementations, the one or more feature metrics can include one or more metrics similar to the microservice metrics described above. In some implementations, the one or more feature metrics associated with the cloud-based feature, and the one or more thresholds associated with the one or more feature metrics, can be determined by the operator of the cloud computing environment, can be determined based on a SLA, and/or the like.

In some implementations, if a microservice is hosted in a plurality of cloud computing environments, the service monitoring platform can receive information, associated with the microservice, from each cloud computing environment. In this way, the microservice monitoring platform can monitor the microservice in each cloud computing environment in which the microservice is hosted. Similarly, if a cloud-based feature is hosted in a plurality of cloud computing environments, the service monitoring platform can receive information, associated with the cloud-based feature, from each cloud computing environment. In this way, the microservice monitoring platform can monitor the cloud-based feature in each cloud computing environment in which the cloud-based feature is hosted.

Turning to FIG. 1B, and as shown by reference number 104, the microservice monitoring platform can determine a service health status for each microservice and/or service of the plurality of microservices and/or services. In some implementations, the microservice monitoring platform can determine the service health status for two or more microservices and/or services, of the plurality of microservices and/or services, in parallel using multithreading, pipelining, and/or any other multiprocessing technique.

In some implementations, the microservice monitoring platform can determine a service health status, for a particular microservice, based on the service information associated with the microservice. For example, the microservice monitoring platform can compare the performance data, associated with a particular microservice metric, with a threshold that is associated with the microservice metric, and can determine the service health status for the microservice based on whether the performance data satisfies the threshold. As an example, the microservice monitoring platform can compare the performance data, associated with an error rate microservice metric, with an error rate threshold (e.g., a 1% error rate, a 0.5% error rate, and/or the like), and can determine the service health status of the microservice as available if the performance data satisfies the error rate threshold or can determine the service health status of the microservice as unavailable if the performance data does not satisfy the error rate threshold. As another example, the microservice monitoring platform can compare the performance data, associated with a latency microservice metric, with a latency threshold (e.g., a 35 ms latency, a 20 ms latency, and/or the like), and can determine the service health status of the microservice as available if the performance data satisfies the latency threshold or can determine the service health status of the microservice as unavailable if the performance data does not satisfy the latency threshold.

In some implementations, the microservice monitoring platform can compare the performance data, associated with a particular microservice metric, with a plurality of thresholds that are associated with the microservice metric, and can determine the service health status for the microservice based on whether the performance data satisfies one or more thresholds of the plurality of thresholds. As an example, the microservice monitoring platform can compare the performance data, associated with an availability microservice metric, with a first availability threshold (e.g., a 98% availability and/or the like) and a second availability threshold (e.g., 95% availability and/or the like), and can determine the service health status of the microservice as available if the performance data satisfies the first availability threshold and the second availability threshold, can determine the service health status of the microservice as unavailable if the performance data does not satisfy the first availability threshold and the second availability threshold, and can determine the service health status of the microservice as warn (or experiencing issues) if the performance data does not satisfy the first availability threshold but satisfies the second availability threshold.

In some implementations, the microservice monitoring platform can compare the performance data, associated with the microservice, with a respective threshold for each microservice metric of the plurality of microservice metrics and can determine the service health status of the microservice as unavailable based on determining that the performance data does not satisfy a respective threshold or a particular quantity of respective thresholds (e.g., the microservice monitoring platform can determine the service health status of the microservice as unavailable if any of the microservice metric thresholds are not satisfied), can determine the service health status of the microservice as available based on determining that the performance data satisfies all of the respective thresholds or a particular quantity of respective thresholds, and/or the like.

In some implementations, the microservice monitoring platform can determine a service health status, for a particular microservice, based on performing one or more tests for the microservice. For example, the microservice monitoring platform can attempt to open a socket connection with a microservice to determine whether the microservice is capable of accepting connections, can perform a ping test for a microservice (e.g., by transmitting a ping request to the microservice) to determine whether the microservice provides a response to the microservice, can transmit a test query to a microservice (e.g., when the microservice is a database microservice, when the microservice is a search microservice, and/or the like) to determine whether the microservice provides a response to the test query, can attempt to transmit a message using a microservice (e.g., when the microservice is a messaging microservice) to determine whether the microservice is capable of delivering the message, and/or the like.

In some implementations, the microservice monitoring platform can determine a service health status, for a particular microservice, based on performing a sequence of tests for the microservice. For example, the microservice monitoring platform can determine a service health status, for a particular microservice, by performing a first test (e.g., an attempt to open a socket connection with the microservice), by performing a second test (e.g., a ping test) based on determining that the first test was unsuccessful, and so on.

In some implementations, the microservice monitoring platform can determine a service health status, for a particular microservice, based on the service health statuses for one or more dependent microservices associated with the microservice. In some implementations, the microservice monitoring platform can identify the one or more dependent microservices, associated with the microservice, based on the information associated with the microservice (e.g., the one or more dependent microservices can be identified in the information associated with the microservice), based on performing an automatic discovery of the one or more dependent services, and/or the like. In some implementations, the microservice monitoring platform can perform an automatic discovery of the one or more dependent services based on performing an analysis of the behavior of the microservice to determine whether the microservice communicates with another microservice, to determine whether the microservice transmit data to and/or receives data from the other microservice, and/or the like. In some implementations, the microservice monitoring platform can perform the automatic discovery based on the microservice being deployed in a cloud computing environment, based on determining the service health status of the microservice health, and/or the like.

In some implementations, the microservice monitoring platform can determine that a microservice is unavailable based on determining that any of the dependent microservices associated with the microservice are unavailable, can determine that a microservice is unavailable based on determining that a particular quantity of the dependent microservices associated with the microservice are unavailable, can determine that a microservice is available based on determining that all of the dependent microservices associated with the microservice are available, can determine that a microservice is unavailable based on determining that a particular quantity of the dependent microservices associated with the microservice are available, and/or the like.

In some implementations, if the microservice monitoring platform determines that a dependent microservice associated with a microservice is unavailable, the microservice monitoring platform can determine the service health status of the microservice based on whether the dependent microservice is critical to the functionality of microservice. For example, if the dependent microservice is unavailable and critical to the microservice, the microservice monitoring platform can determine the service health status for the microservice as unavailable. As another example, if the dependent microservice is unavailable and not critical to the microservice, the microservice monitoring platform can determine the service health status for the microservice as warn (or experiencing issues). The microservice monitoring platform can determine whether a dependent microservice is critical to an associated microservice based on various factors, such as whether the microservice is capable of substantially providing the functionality of the microservice while the dependent microservice is unavailable, such as whether the operator of cloud computing environment in which the microservice and/or the dependent microservice is hosted has identified the dependent microservice as critical to the microservice, and/or the like.

In some implementations, the microservice monitoring platform can determine the service health status, for a particular microservice, based on the service type to which the microservice is associated. For example, the microservice monitoring platform can determine the service health status, for a microservice that is associated with the internal microservice type, based on whether the performance data, associated with the microservice satisfies a threshold; can determine the service health status, for a microservice that is associated with the external microservice type, based on performing one or more tests for the microservice; and/or the like.

As further shown in FIG. 1B, and as shown by reference number 106, the microservice monitoring platform can determine a feature health status for each cloud-based feature of the plurality of cloud-based features. In some implementations, if a particular cloud-based feature is hosted in a plurality of cloud computing environments, the microservice monitoring platform can determine a feature health status, for the cloud-based feature, for each cloud computing environment in which the cloud-based feature is hosted.

In some implementations, the microservice monitoring platform can determine a feature health status for a particular cloud-based feature based on comparing performance data, associated with the cloud-based feature, with one or more thresholds, similar to as described above in connection with the plurality of microservices. For example, the microservice monitoring platform can determine whether the performance data, associated with an error rate metric, satisfies an error rate threshold; can determine whether the performance data, associated with an availability metric, satisfies an availability metric; can determine whether the performance data, associated with a latency metric, satisfies a latency metric; and/or the like.

In some implementations, the microservice monitoring platform can determine a feature health status, for a particular cloud-based feature, based on performing one or more tests for the cloud-based feature, similar to as described above in connection with the plurality of microservices. For example, the microservice monitoring platform can attempt to open a socket connection with the cloud-based feature, can perform a ping test for the cloud-based feature, can transmit test queries or test messages to the cloud-based feature, and/or the like.

In some implementations, the microservice monitoring platform can determine a feature health status, for a particular cloud-based feature, based on the service health status of one or more microservices that are used to provide the cloud-based feature. For example, the microservice monitoring platform can determine the service health status for the one or more microservices as described above, and can determine that the cloud-based feature is unavailable based on determining that any of the one or more microservices are unavailable, can determine that the cloud-based feature is unavailable based on determining that a particular quantity of the one or more microservices are unavailable, can determine that cloud-based feature is available based on determining that all of the one or more microservices are available, can determine that a cloud-based feature is available based on determining that a particular quantity of the one or more microservices are available, and/or the like.

In some implementations, if the microservice monitoring platform determines that a microservice, that is used to provide a cloud-based feature, is unavailable, the microservice monitoring platform can determine the feature health status of the cloud-based feature based on whether the microservice is critical to the functionality of the cloud-based feature. For example, if the dependent microservice is unavailable and critical to the functionality of the cloud-based feature, the microservice monitoring platform can determine the feature health status for the cloud-based feature as unavailable. As another example, if the microservice is unavailable and not critical to the functionality of the cloud-based feature, the microservice monitoring platform can determine the feature health status for the cloud-based feature as warn (or experiencing issues). The microservice monitoring platform can determine whether a microservice is critical to a cloud-based feature based on various factors, such as whether the cloud-based feature is capable of substantially providing the functionality of the cloud-based feature while the microservice is unavailable, such as whether the operator of cloud computing environment in which the cloud-based feature and/or the microservice is hosted has identified the microservice as critical to the cloud-based feature, and/or the like.

In some implementations, the microservice monitoring platform can store the service health statuses, for the plurality of microservices and/or services, in a microservice health data store, can store the feature health statuses, for the plurality of cloud-based features, in a feature health data store, and/or the like. In some implementations, the microservice health data store and the feature health data store can be implemented by the same data structure (e.g., an electronic file, a database, a storage device, a memory device, and/or the like), can be implemented by physically and/or logically separate data structures, and/or the like.

Turning to FIG. 1C, and as shown by reference number 108, the microservice monitoring platform can transmit, to the client device, information identifying the service health statues for the plurality of microservices and/or services, can transmit information identifying the feature health statues for the plurality of cloud-based features, and/or the like. In some implementations, the microservices monitoring platform can transmit one or more instructions to the client device (and/or to the server device, to another device, to one or more cloud computing environments, and/or the like), such as an instruction to display the service health statuses for the plurality of microservices and/or services, an instruction to display a service health status for a particular microservice and/or service, an instruction to display the feature health statuses for the plurality of cloud-based features, an instruction to display a feature health status for a particular cloud-based feature, and/or the like. In some implementations, the microservice monitoring platform can automatically transmit the one or more instructions based on determining the service health statuses, based on determining the feature health statuses, and/or the like. In some implementations, the microservice monitoring platform can transmit the one or more instructions based on receiving a request, from the client device, for the service health statuses, for the feature health statuses, and/or the like.

In some implementations, the microservice monitoring platform can receive the request and/or can transmit the service health statuses, feature health statuses, and/or the one or more instructions via an application programming interface (API), such as a representational state transfer (REST) based API and/or any other type of API. In some implementations, the microservice monitoring platform can transmit the microservice health statues via a first API, and can transmit the feature health statuses via a second API that is different from the first API, can transmit the service health statuses and the feature health statuses via the same API, and/or the like.

In some implementations, the microservice monitoring platform can transmit, to the client device, an instruction to display the service health statuses, for the plurality microservices, for each cloud computing environment in which the plurality of microservices and/or services is hosted. In some implementations, the microservice monitoring platform can transmit, to the client device, an instruction to display the feature health statuses, for the plurality cloud-based features, for each cloud computing environment in which the plurality of cloud-based features is hosted.

In some implementations, the microservice monitoring platform can transmit, to the client device, an instruction to display the performance data, for a particular microservice, for one or more microservice metrics associated with the microservice. In some implementations, the microservice monitoring platform can transmit, to the client device, an instruction to display the performance data, for a particular cloud-based feature, for one or more feature metrics associated with the cloud-based feature.

In some implementations, the microservice monitoring platform can automatically perform one or more actions based on determining the service health statuses for the plurality of microservices and/or services, based on determining the feature health statuses for the plurality of cloud-based features, and/or the like. For example, the microservice monitoring platform can perform a root-cause analysis to determine a root cause for why a microservice is unavailable (e.g., by performing one or more diagnostic tests, by identifying one or more dependent microservices associated with the microservice and the service health statuses of the one or more dependent microservices, and/or the like), can perform one or more recovery actions to resolve any issues with a microservice (e.g., resetting the microservice, assigning a new IP address to the microservice, and/or the like), can transmit an instruction (e.g., to a network device, to the client device, and/or the like) to use microservice hosted in a cloud computing environment to provide a cloud-based feature based on determining that the microservice is unavailable in a another cloud computing environment, and/or the like. As another example, the microservice monitoring platform can perform a root-cause analysis to determine a root cause for why a cloud-based feature is unavailable, can perform one or more recovery actions to resolve any issues with a cloud-based feature, can provide an instruction (e.g., to a network device, to the client device, and/or the like) to redirect a service request, associated with a cloud-based feature, from a first cloud computing environment to second cloud computing environment based on determining that the cloud-based feature is unavailable in the first cloud-computing environment, and/or the like.

In this way, the microservice monitoring platform can provide health monitoring for various types of microservices and/or services (e.g., for microservices associated with the internal microservice type, for microservices associated with the external microservice type, for resource services associated with the resource service type, and/or the like), which increases the capability of the microservice monitoring platform to monitor, track, troubleshoot, and/or manage the microservices. Moreover, in this way, the microservice monitoring platform can provide health monitoring for microservices and/or cloud-based features across a plurality of cloud computing environments, which allows the microservice monitoring platform to provide a cloud-based feature using microservices in different cloud computing environments based on the service health statuses of the microservices in the different cloud computing environments, which allows the microservice monitoring platform to configure the routing of service requests for a particular cloud-based feature based on the feature health statues, for the cloud-based feature, in the different cloud computing environments, which increases the flexibility in providing the cloud-based feature, increases the availability and reliability of the cloud-based feature, and/or the like.

In addition, the microservice monitoring platform can determine a service health status for a microservice and/or a feature health status for a cloud-based feature based on a plurality of factors, which increases the accuracy of the feature health status determination. Moreover, the microservice monitoring platform is capable of integrating the monitoring of services associated with a resource service type, which increases the ability of the microservice monitoring platform to monitor services that are used by other microservices in the cloud computing environments. Furthermore, the microservice monitoring platform is capable of being deployed in the cloud computing environments as a microservice, is capable of being deployed as a standalone device, and/or the like, which increases the flexibility of deploying the microservice monitoring platform.

As indicated above, FIGS. 1A-1C are provided merely as an example. Other examples are possible and can differ from what was described with regard to FIGS. 1A-1C.

Figure 2B:
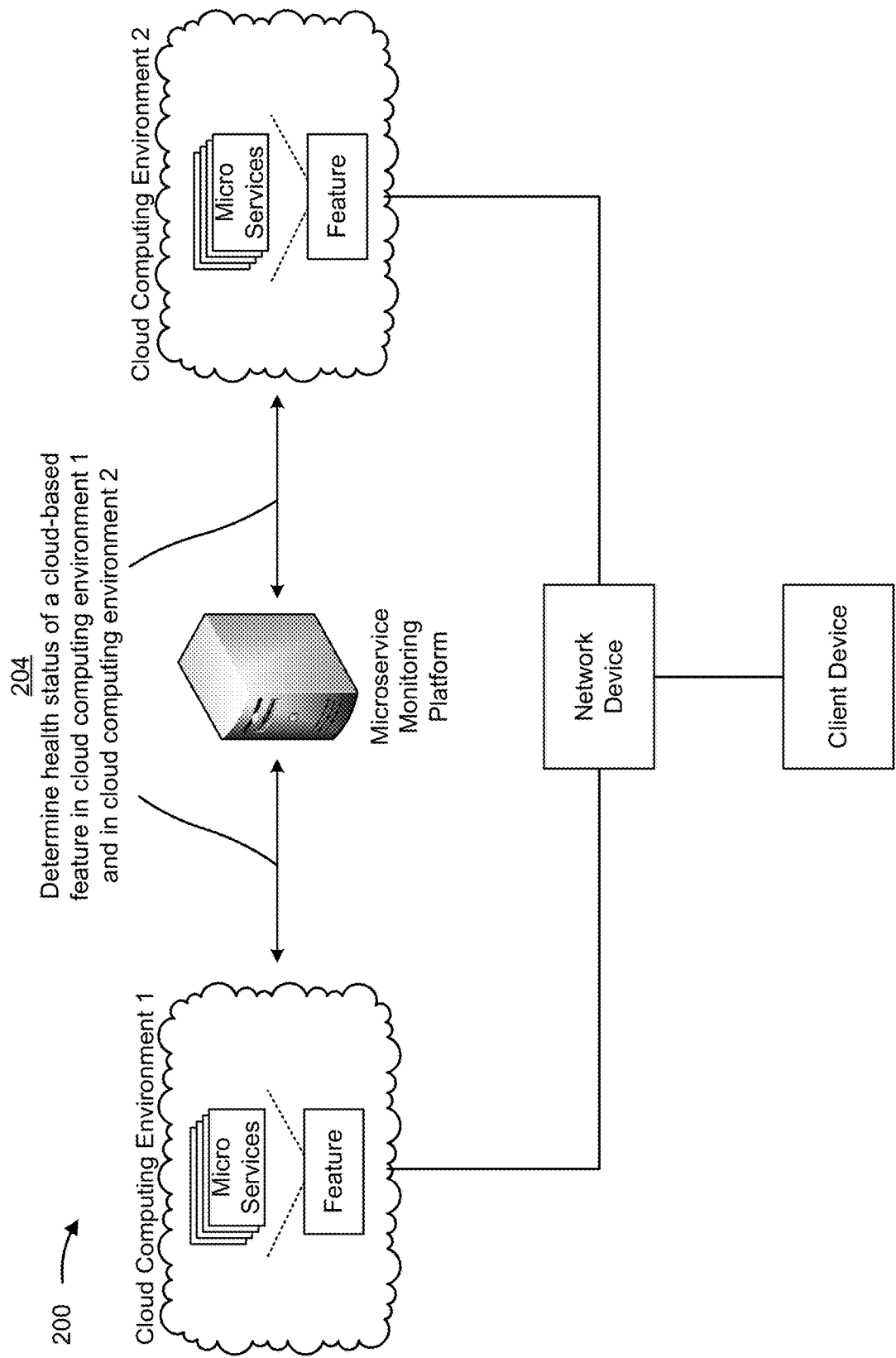
Figure 2C:
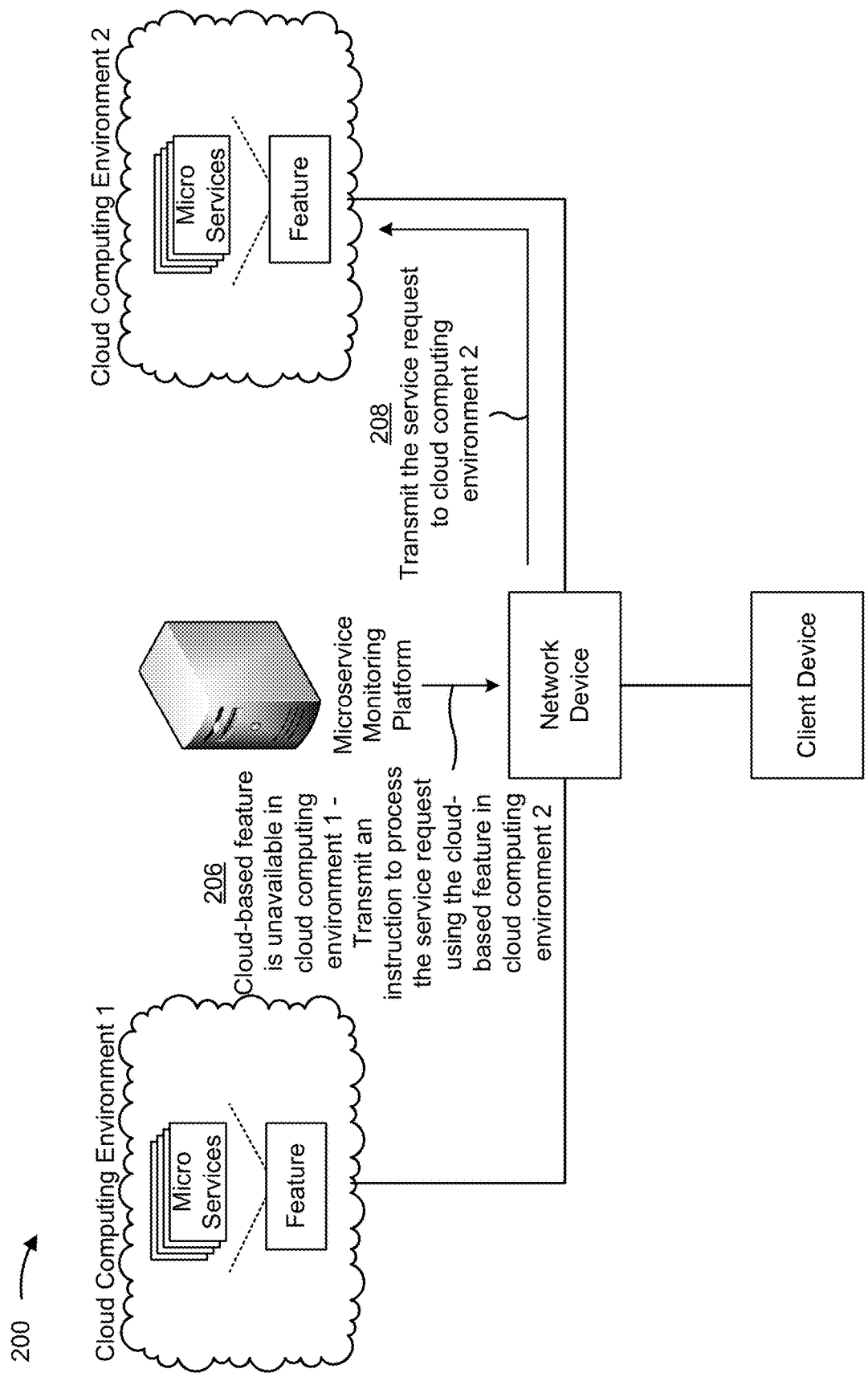

FIGS. 2A-2C are diagrams of an example implementation 200 described herein. As shown in FIGS. 2A-2C, implementation 200 can include a plurality of cloud computing environments (e.g., cloud computing environment 1, cloud computing environment 2, collectively referred to as "cloud computing environments" and individually as "cloud computing environment"), a client device, a network device, a service monitoring platform, and/or the like. The quantity and arrangement of components illustrated in implementation 200 is an example, and greater and/or fewer components can be included in implementation 200.

In some implementations, cloud computing environment 1 can be implemented in a first data center and cloud computing environment 2 can be implemented in a second data center. In some implementations, the first data center and the second data center can be geographically located in different geographic regions (e.g., different cities, different states, different countries, and/or the like). In some implementations, cloud computing environment 1 can host a cloud-based feature, which can use one or more microservices hosted in cloud computing environment 1. Similarly, cloud computing environment 2 can host a cloud-based feature, which can use one or more microservices hosted in cloud computing environment 2. In some implementations, the cloud-based feature hosted in cloud computing environment 1 can be the same cloud-based feature hosted in cloud computing environment 2. In this way, the cloud-based feature can be more reliable in that if the cloud-based feature becomes unavailable in a first cloud computing environment, a service request associated with the cloud-based feature can still be processed using the cloud-based feature in the second cloud computing environment.

In some implementations, the network device (e.g., a switch, a router, a base station, and/or the like) can be communicatively connected to cloud computing environment 1, cloud computing environment 2, and the client device such that the network device can receive service requests from the client device (e.g., service requests to use one or more cloud-based features hosted by cloud computing environment 1 and/or cloud computing environment 2), and can transmit the service requests to cloud computing environment 1 and/or cloud computing environment 2.

Turning to FIG. 2A, and as shown by reference number 202, the client device can transmit a service request to the network device. In some implementations, the service request can be associated with the cloud-based feature hosted in cloud computing environment 1 and cloud computing environment 2. In some implementations, the cloud-based feature can include any of the cloud-based features described above in connection with FIGS. 1A-1C.

Turning to FIG. 2B, and as shown by reference number 204, the microservice monitoring platform can determine a first feature health status for the cloud-based feature, as hosted in cloud computing environment 1, and can determine a second feature health status, for the cloud-based feature, as hosted in cloud computing environment 2. In some implementations, the microservice monitoring platform can determine the first feature health status and/or the second feature health status using any of the techniques described above in connection with FIGS. 1A-1C. In some implementations, the microservice monitoring platform can determine the first feature health status and/or the second feature health status based on the network device receiving the service request, before the network device receives the service request (e.g., based on a previously received service request, based on periodically determining the first feature health status and/or the second feature health status at a particular time interval, and/or the like), and/or the like. In the example illustrated in FIGS. 2A-2C, the microservice monitoring platform can determine the first feature health status as unavailable (e.g., the cloud-based feature is unavailable in cloud computing environment 1) and can determine the second feature health status as available (e.g., the cloud-based feature is available in cloud computing environment 2).

Turning to FIG. 2C, and as shown by reference number 206, based on determining the first feature health status as unavailable and the second feature health status as available, the microservice monitoring platform can transmit, to the network device, an instruction to process the service request using the cloud-based feature as hosted in cloud computing environment 2. As shown by reference number 208, the network device can receive the instruction and can transmit the service request to cloud computing environment 2 to be processed by the cloud-based feature as hosted in cloud computing environment 2.

In this way, the microservice monitoring platform can continuously monitor the feature health statues of cloud-based features hosted in different cloud computing environments, and can automatically configure the network device to route service requests based on the feature health statues of the cloud-based features hosted in the different cloud computing environments. In this way, the microservice monitoring platform can reduce the latency in processing service requests and can reduce the quantity of dropped service requests (e.g., by ensuring that the service requests are transmitted to a cloud computing environment in which the cloud-based feature associated with the service requests is available), as well as can increase the overall flexibility and operation of the cloud-based feature.

As indicated above, FIGS. 2A-2C are provided merely as an example. Other examples are possible and can differ from what was described with regard to FIGS. 2A-2C.

FIGS. 3A-3D are illustrations of various graphical client interface (GUI) views that can be generated by a client device, by a server device, by a microservice monitoring platform, and/or the like, as described herein.

Figure 3A:
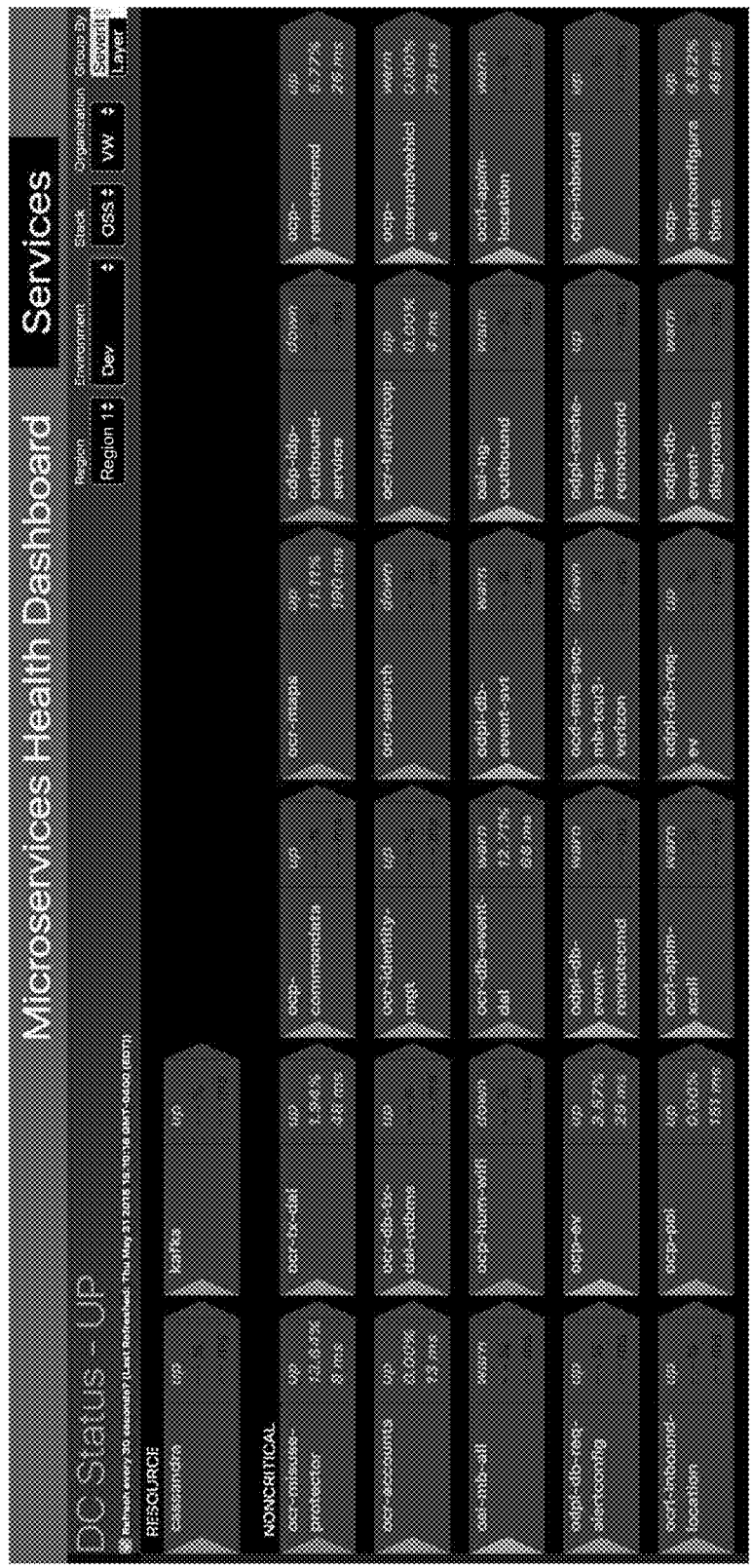
FIGS. 3A-3D are illustrations of various graphical client interface views described herein.

As shown in FIG. 3A, GUI view 310 can include a display of a microservices health dashboard, which can display service health statuses for a plurality of microservices and/or services. In some implementations, the service health statuses for the plurality of microservices and/or services can be displayed by region (e.g., for each cloud computing environment in which the plurality of microservices and/or services is hosted), and can be displayed in different categories, types, and/or the like, of microservices and/or services. For example, and as shown in GUI view 310, the plurality of microservices and/or services displayed for Region 1 can be grouped according to the service type associated with the plurality of microservices and/or services (e.g., a subset of microservices that are associated with a resource service type is displayed in GUI view 310), can be grouped according to the criticality of the plurality of microservices and/or services (e.g., a subset of microservices that are identified as noncritical is displayed in GUI view 310), and/or the like.

In some implementations, GUI view 310 can include a display of the overall health status for the region (e.g., "DC Status—UP" as shown in GUI view 310). In some implementations, GUI view 310 can display the service health status for the plurality of microservices, can display performance data for one or more microservice metrics for the plurality of microservices, and/or the like. For example, as shown in FIG. 3A, GUI view 310 can display an ocr-accounts microservice, can display the service health status for the ocr-accounts microservice (e.g., "up"), can display an error rate metric for the ocr-accounts microservice (e.g., 0.00%), can display a latency metric for the ocr-accounts microservice (e.g., 13 ms), and/or the like. In some implementations, the one or more microservice metrics that are displayed, in GUI view 310 for a microservice, can be selected based on whether the one or more microservice metrics are used to determine the service health status of the microservice. For example, the error rate metric and the latency metric can be used to determine the service health status of the ocr-accounts microservice.

Figure 3B:
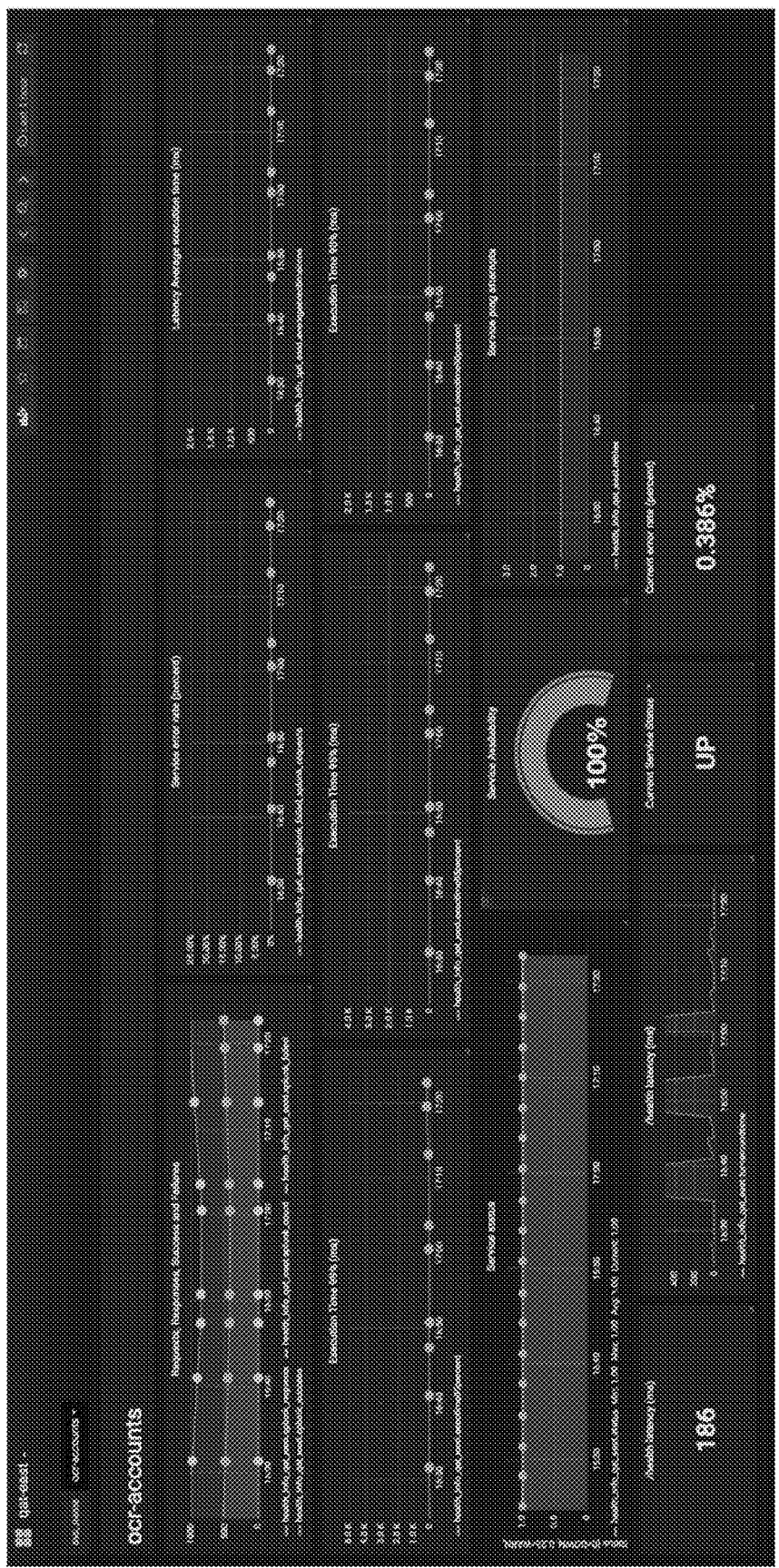

As shown in FIG. 3B, GUI view 320 can include a detailed display of a particular microservice (e.g., the ocr-accounts microservice). In some implementations, a user can interact with GUI view 310 to view GUI view 320 (e.g., by selecting the microservice from GUI view 310) and/or using other techniques.

The detailed display of the ocr-accounts microservice can include a display of a plurality of microservice metrics for the ocr-accounts microservice, performance data associated with each microservice metric of the plurality of microservice metrics, and/or the like. For example, GUI view 320 can display performance data for the processing of service requests by the ocr-accounts microservice, can display performance data for error rates for processing the services request, can display performance data for latency in processing the service requests (e.g., average latency, $99^{th}$ percentile latency, $95^{th}$ percentile latency, $90^{th}$ percentile latency, and/or the like), can display performance data for the availability of the ocr-accounts microservice, can display a current service health status of the ocr-accounts microservice, can display performance data for responding to ping tests, and/or the like.

Figure 3C:
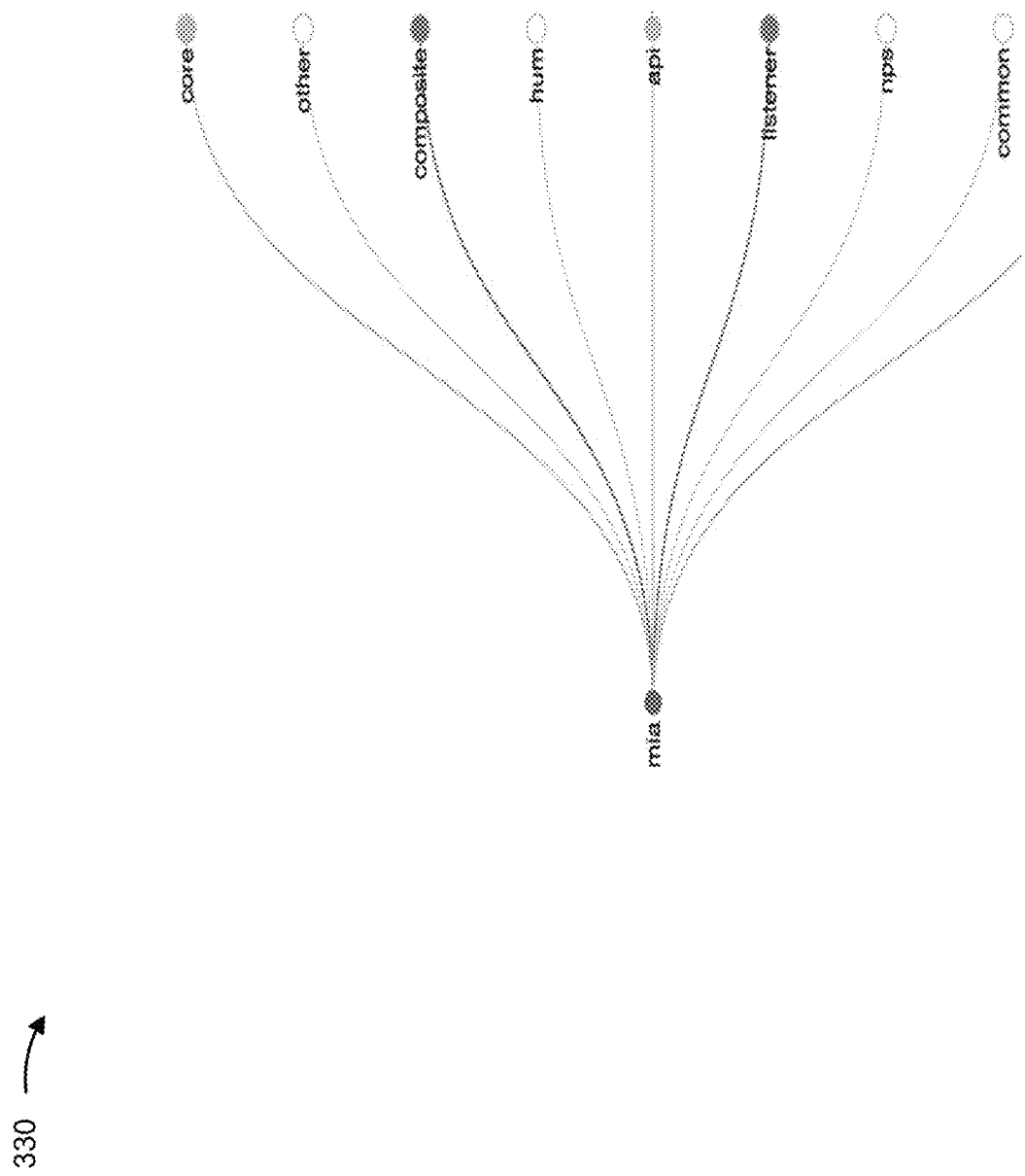

As shown in FIG. 3C, GUI view 330 can include a display of a dependency tree for a particular microservice (e.g., a mia microservice). The dependency tree can visually illustrate the dependent microservices associated with the microservice, the service health status of the microservice, the service health statuses of the dependent microservices, and/or the like. In some implementations, GUI view 330 can further illustrate dependency trees for each of the dependent microservices associated with this microservice. In this way, the complex dependencies of microservices can be easily viewed and quickly understood, so that any issues with a microservice or dependent microservice can be quickly identified and resolved.

Figure 3D:
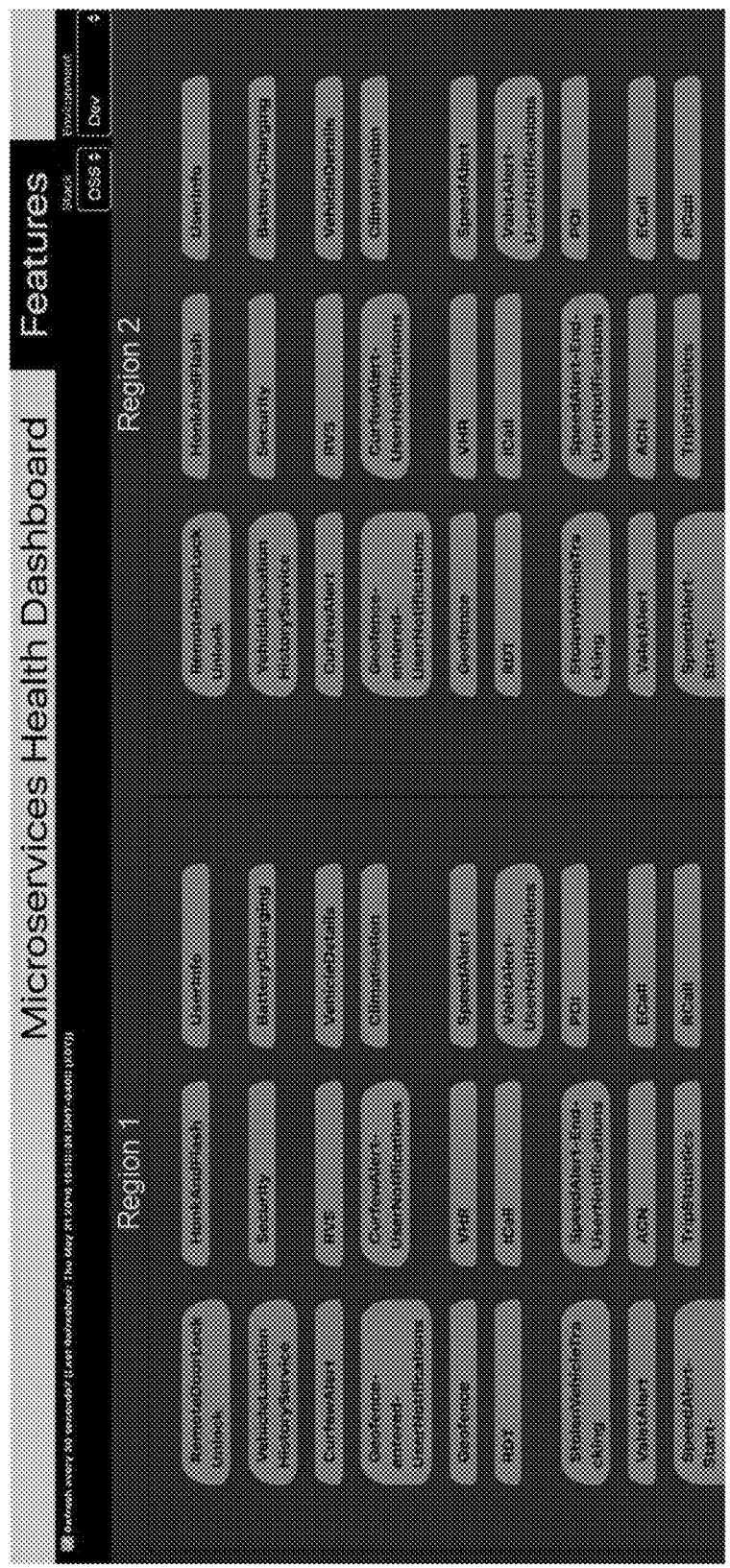

As shown in FIG. 3D, GUI view 340 can include a display of another microservices health dashboard, which can display feature health statuses for a plurality of cloud-based features. In some implementations, the feature health statuses for the plurality of cloud-based features can be displayed by region (e.g., for each cloud computing environment in which the plurality of cloud-based features is hosted). For example, GUI view 340 can display the feature health statuses for the plurality of cloud-based features in Region 1, can display the feature health statuses for the plurality of cloud-based features in Region 2, and/or the like. In some implementations, a user can interact with a cloud-based feature to view a GUI view (similar to GUI view 320) that displays detailed feature metric data associated with the cloud-based feature, can interact with the cloud-based feature to view a GUI view (similar to GUI view 330) that displays a dependency tree, for the cloud-based feature, that displays the one or more microservices that are used to provide the cloud-based feature, and/or the like.

As indicated above, FIGS. 3A-3D are provided merely as an example. Other examples are possible and can differ from what was described with regard to FIGS. 3A-3D.

Figure 4:
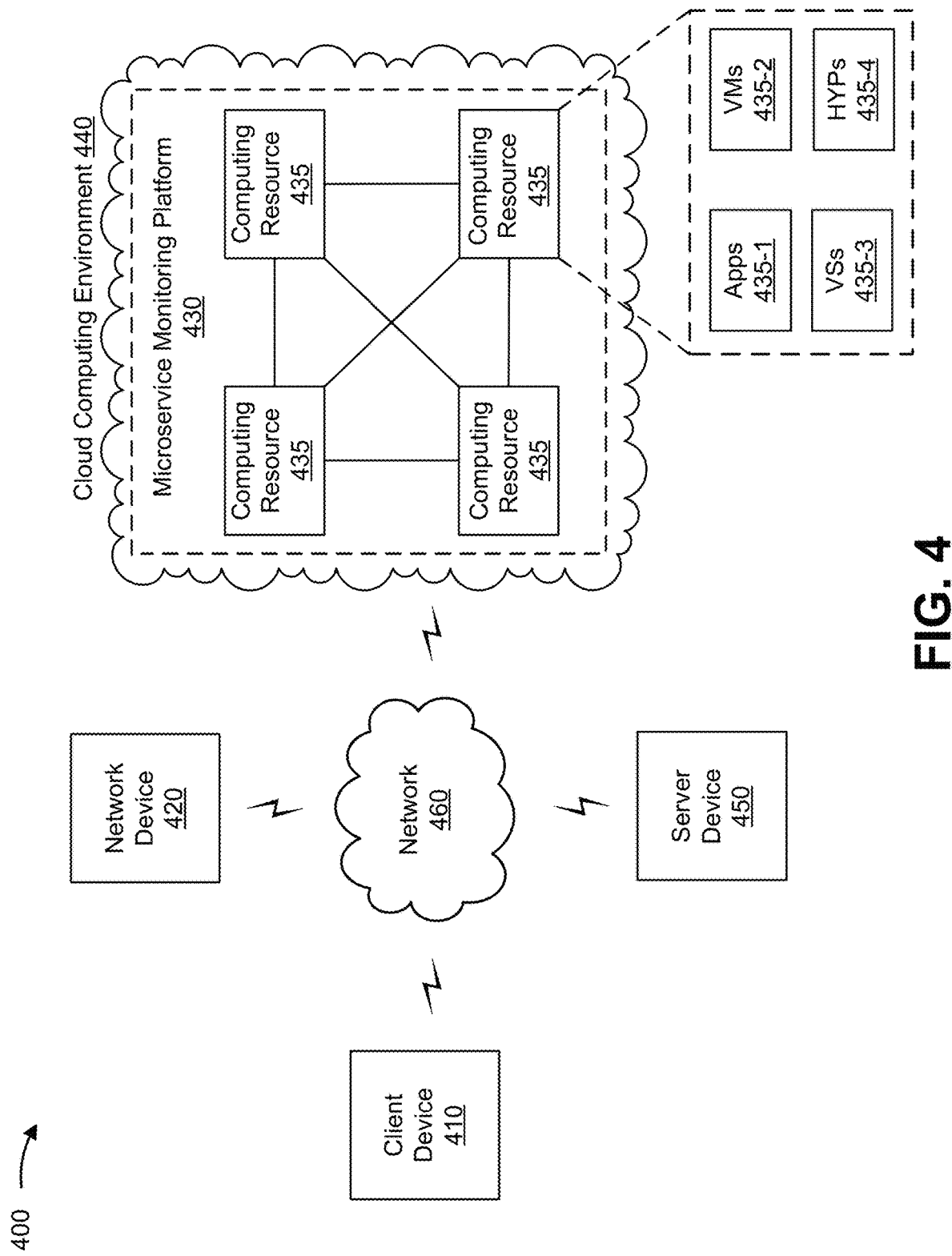
FIG. 4 is a diagram of an example environment in which systems and/or methods, described herein, can be implemented.

FIG. 4 is a diagram of an example environment 400 in which systems and/or methods, described herein, can be implemented. As shown in FIG. 4, environment 400 can include a client device 410, a network device 420, a microservice monitoring platform 430 in a cloud computing environment 440 that includes a set of computing resources 435, a server device 450, and a network 460. Devices of environment 400 can interconnect via wired connections, wireless connections, or a combination of wired and wireless connections.

Client device 410 includes one or more devices capable of receiving, generating, storing, processing, and/or providing data associated with monitoring cloud-based services and/or features. For example, client device 410 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device.

In some implementations, client device 410 can provide a service request, to cloud computing environment 440, to be processed using a cloud-based feature hosted by cloud computing environment, can provide the service request to another cloud computing environment, and/or the like. In some implementations, client device 410 can receive, from microservice monitoring platform 430, information associated with a microservice and/or a cloud-based feature, such as performance data associated with the microservice, performance data associated with the cloud-based feature, a service health status for the microservice, a feature health status for the cloud-based feature, and/or the like. Client device 410 can display the information associated with the microservice and/or the cloud-based feature in a graphical user interface (GUI).

Network device 420 includes one or more devices capable of receiving, generating, storing, processing, and/or providing data associated with monitoring cloud-based services and/or features. In some implementations, network device 420 can include a firewall, a router, a gateway, a switch, a bridge, a wireless access point, a base station, and/or the like. In some implementations, network device 420 can be implemented as a physical device implemented within a housing, such as a chassis. In some implementations, network device 420 can be implemented as a virtual device implemented by one or more computer devices of a cloud computing environment or a data center.

In some implementations, network device 420 can receive a service request from client device 410 and can route the service request to cloud computing environment 440, to another cloud computing environment, and/or the like. In some implementations, network device 420 can receive, from microservice monitoring platform, an instruction to route a particular service request to cloud computing environment 440 or another cloud computing environment based on whether a cloud-based feature, associated with the service request, is available in cloud computing environment 440, is available in the other cloud computing environment, and/or the like.

Microservice monitoring platform 430 includes one or more devices capable of receiving, generating, storing, processing, and/or providing data associated with monitoring cloud-based services and/or features. For example, microservice monitoring platform 430 can determine a service health status for a microservice (e.g., for a microservice hosted in cloud computing environment 440, for a microservice hosted in another cloud computing environment, for a microservice hosted by server device 450, and/or the like), can determine a feature health status for a cloud-based feature (e.g., for a cloud-based feature hosted in cloud computing environment 440, for a cloud-based feature hosted in another cloud computing environment, and/or the like), can transmit, to client device 410 and/or server device 450, an instruction to display the service health status and/or the feature health status, an instruction to display performance data associated with the microservice and/or the cloud-based feature, and/or the like. In some implementations, microservice monitoring platform can transmit, to network device 420, an instruction to route a service request, received from client device 410, to cloud computing environment 440, to another cloud computing environment, and/or the like, based on the service health status, based on the feature health status, and/or the like.

In some implementations, as shown, microservice monitoring platform 430 can be hosted in cloud computing environment 440. Notably, while implementations described herein describe microservice monitoring platform 430 as being hosted in cloud computing environment 440, in some implementations, microservice monitoring platform 430 may not be cloud-based (i.e., can be implemented outside of a cloud computing environment) or can be partially cloud-based.

Cloud computing environment 440 includes an environment that hosts microservice monitoring platform 430. Cloud computing environment 440 can provide computation, software, data access, storage, and/or other services. As shown, cloud computing environment 440 can include a group of computing resources 435 (referred to collectively as "computing resources 435" and individually as "computing resource 435").

Computing resource 435 includes one or more personal computers, workstation computers, server devices, or another type of computation and/or communication device. In some implementations, computing resource 435 can host microservice monitoring platform 430. The cloud resources can include compute instances executing in computing resource 435, storage devices provided in computing resource 435, data transfer devices provided by computing resource 435, etc. In some implementations, computing resource 435 can communicate with other computing resources 435 via wired connections, wireless connections, or a combination of wired and wireless connections.

As further shown in FIG. 4, computing resource 435 can include a group of cloud resources, such as one or more applications ("APPs") 435-1, one or more virtual machines ("VMs") 435-2, one or more virtualized storages ("VSs") 435-3, or one or more hypervisors ("HYPs") 435-4.

Application 435-1 includes one or more software applications that can be provided to or accessed by one or more devices of environment 400. Application 435-1 can eliminate a need to install and execute the software applications on devices of environment 400. For example, application 435-1 can include software associated with microservice monitoring platform 430 and/or any other software capable of being provided via cloud computing environment 440. In some implementations, one application 435-1 can send/receive information to/from one or more other applications 435-1, via virtual machine 435-2. In some implementations, application 435-1 can include a software application associated with one or more databases and/or operating systems. For example, application 435-1 can include an enterprise application, a functional application, an analytics application, and/or the like.

Virtual machine 435-2 includes a software implementation of a machine (e.g., a computer) that executes programs like a physical machine. Virtual machine 435-2 can be either a system virtual machine or a process virtual machine, depending upon use and degree of correspondence to any real machine by virtual machine 435-2. A system virtual machine can provide a complete system platform that supports execution of a complete operating system ("OS"). A process virtual machine can execute a single program, and can support a single process. In some implementations, virtual machine 435-2 can execute on behalf of a user (e.g., a user of client device 410 and/or the like), and can manage infrastructure of cloud computing environment 440, such as data management, synchronization, or long-duration data transfers.

Virtualized storage 435-3 includes one or more storage systems and/or one or more devices that use virtualization techniques within the storage systems or devices of computing resource 435. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end clients. File virtualization can eliminate dependencies between data accessed at a file level and a location where files are physically stored. This can enable optimization of storage use, server consolidation, and/or performance of non-disruptive file migrations.

Hypervisor 435-4 provides hardware virtualization techniques that allow multiple operating systems (e.g., "guest operating systems") to execute concurrently on a host computer, such as computing resource 435. Hypervisor 435-4 can present a virtual operating platform to the guest operating systems, and can manage the execution of the guest operating systems. Multiple instances of a variety of operating systems can share virtualized hardware resources.

Server device 450 includes one or more devices capable of receiving, generating, storing, processing, and/or providing information associated with monitoring cloud-based services and/or features. For example, server device 450 can include a laptop computer, a tablet computer, a desktop computer, a server device, a group of server devices, or a similar type of device, which hosts one or more microservice external to cloud computing environment 440. In some implementations, server device 450 can transmit, to microservice monitoring platform 430, information associated with the one or more microservices hosted by server device 450.

Network 460 includes one or more wired and/or wireless networks. For example, network 460 can include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there can be additional devices and/or networks, fewer devices and/or networks, different devices and/or networks, or differently arranged devices and/or networks than those shown in FIG. 4. Furthermore, two or more devices shown in FIG. 4 can be implemented within a single device, or a single device shown in FIG. 4 can be implemented as multiple, distributed devices. Additionally, or alternatively, a set of devices (e.g., one or more devices) of environment 400 can perform one or more functions described as being performed by another set of devices of environment 400.

Figure 5:
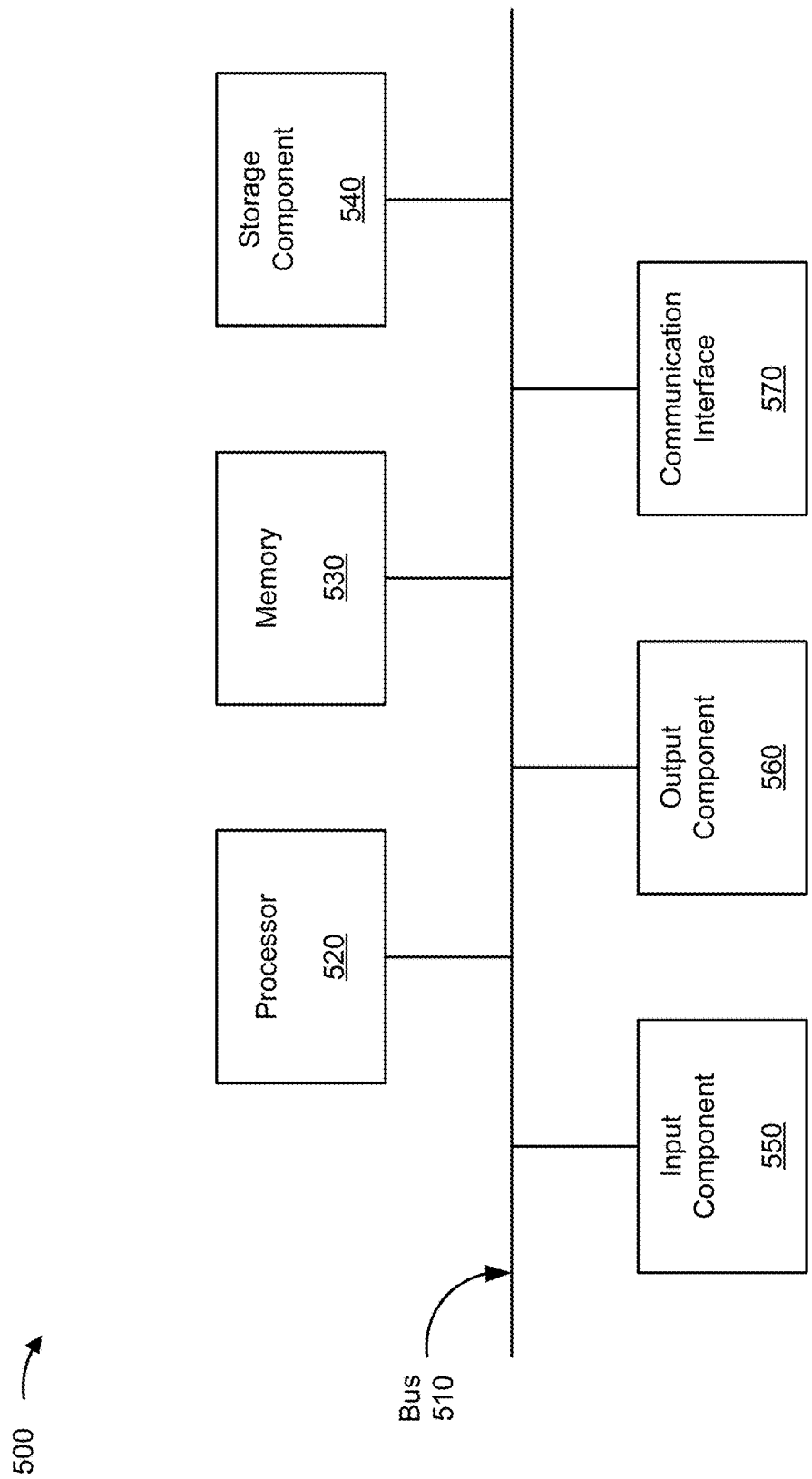
FIG. 5 is a diagram of example components of one or more devices of FIG. 4.

FIG. 5 is a diagram of example components of a device 500. Device 500 can correspond to client device 410, network device 420, microservice monitoring platform 430, cloud computing resource 435, server device 450, and/or the like. In some implementations, client device 410, network device 420, microservice monitoring platform 430, cloud computing resource 435, and/or server device 450 can include one or more devices 500 and/or one or more components of device 500. As shown in FIG. 5, device 500 can include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via client input (e.g., a touch screen display, a keyboard, a keypad, a mouse, a button, a switch, and/or a microphone). Additionally, or alternatively, input component 550 can include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a wireless local area network interface, a cellular network interface, or the like.

Device 500 can perform one or more processes described herein. Device 500 can perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

Figure 6:
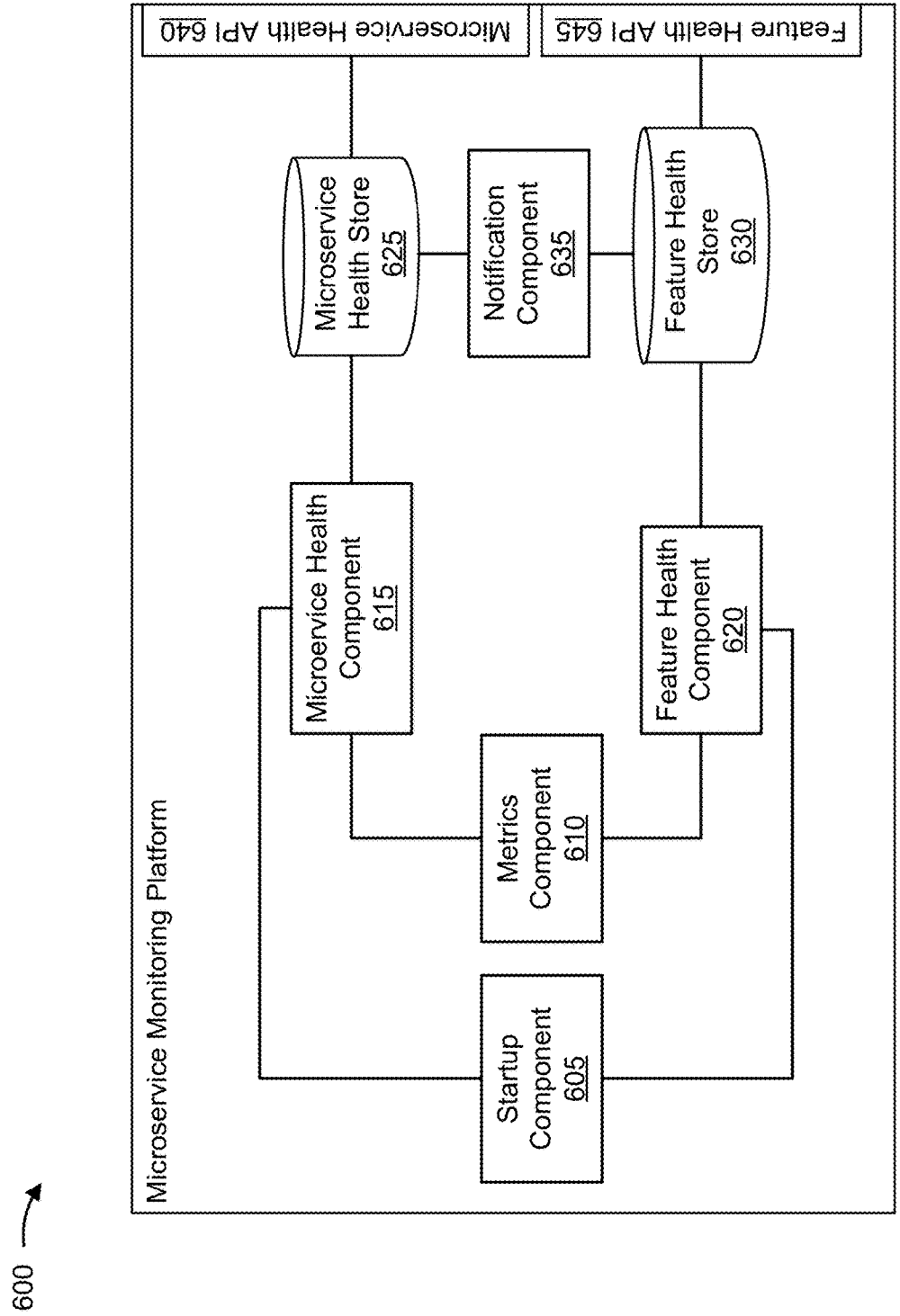
FIG. 6 is a diagram of an example service monitoring platform described herein.

FIG. 6 is a diagram of an example microservice monitoring platform (e.g., microservice monitoring platform 600), as described herein. Microservice monitoring platform 600 can monitor cloud-based microservices and/or features hosted in one or more cloud computing environments (e.g., cloud computing environment 440), hosted by a server device (e.g., server device 450) external to the one or more cloud computing environments, and/or the like, as described herein. In some implementations, microservice monitoring platform 600 can be implemented by microservice monitoring platform 430 of FIG. 4, by device 500 of FIG. 5, by one or more components of device 500, and/or the like.

As shown in FIG. 6, microservice monitoring platform 600 can include various components, such as a startup component 605, a metrics component 610, a microservice health component 615, a feature health component 620, a microservice health store 625, a feature health store 630, a notification component 635, a microservice health API 640, a feature health API 645, and/or the like. In some implementations, the components included in FIG. 6 can be implemented by separate components and/or devices, can be included in the same component and/or device, and/or the like.

Startup component 605 can store and/or cache service information associated with a plurality of microservices, can store and/or cache feature information associated with a plurality of cloud-based features, and/or the like. In some implementations, startup component 605 can receive the service information and/or the feature information at periodic time intervals, based on transmitting a request for the service information and/or the feature information, and/or the like. In some implementations, the service information and/or the feature information can include information described above in connection with FIGS. 1A-1C, 2A-2C, 3A-3D, and/or the like.

In some implementations, startup component 605 can provide the service information to microservice health component 615 based on a startup of microservice monitoring platform 600, based on microservice health component 615 requesting the service information, based on startup component 605 receiving the service information, and/or the like. Similarly, startup component 605 can provide the feature information to feature health component 620 based on the startup of microservice monitoring platform 600, based on feature health component 620 requesting the feature information, based on startup component 605 receiving the feature information, and/or the like.

Metric component 610 can store and/or cache microservice metrics associated with the plurality of microservices, can store and/or cache feature metrics associated with the plurality of cloud-based features, and/or the like. In some implementations, the microservice metrics and/or the feature metrics can include one or more metrics described above in connection with FIGS. 1A-1C, 2A-2C, 3A-3D, and/or the like.

In some implementations, metrics component 610 can provide the microservice metrics to microservice health component 615 based on a startup of microservice monitoring platform 600, based on microservice health component 615 requesting the microservice metrics, based on metrics component 610 receiving the microservice metrics, and/or the like. Similarly, metrics component 610 can provide the feature metrics to feature health component 620 based on the startup of microservice monitoring platform 600, based on feature health component 620 requesting the feature metrics, based on metrics component 610 receiving the feature metrics, and/or the like.

Microservice health component 615 can determine service health statuses for the plurality of microservices. For example, microservice health component 615 can determine the service health statuses for the plurality of microservices, as described above in connection with FIGS. 1A-1C, 2A-2C, 3A-3D, and/or the like. Microservice health component 615 can store the service health statuses in microservice health store 625. Microservice health store 625 can receive the service health statuses and can provide the service health statuses to a client device, to a server device, and/or the like, via microservice health API 640, as described above in connection with FIGS. 1A-1C, 2A-2C, 3A-3D, and/or the like. In some implementations, microservice health API 640 may be a REST-based API and/or any other type of application programming interface.

Feature health component 620 can determine feature health statuses for the plurality of cloud-based features. For example, feature health component 620 can determine the feature health statuses for the plurality of cloud-based features, as described above in connection with FIGS. 1A-1C, 2A-2C, 3A-3D, and/or the like. Feature health component 620 can store the feature health statuses in feature health store 630. Feature health store 630 can receive the feature health statuses and can provide the feature health statuses to a client device, to a server device, and/or the like, via feature health API 645, as described above in connection with FIGS. 1A-1C, 2A-2C, 3A-3D, and/or the like. In some implementations, feature health API 645 may be a REST-based API and/or any other type of application programming interface.

Notification component 635 can monitor microservice health store 625 and/or feature health store 630, and can provide notifications based on the service health statuses and/or the feature health statuses. For example, notification component 635 can determine that a service health status, for a particular microservice, indicates that the microservice is unavailable, and accordingly can provide a notification (e.g., a text message, an email, a popup, and/or the like) to a user of microservice monitoring platform 600 and/or another user that indicates the microservice is unavailable. Similarly, notification component 635 can determine that a feature health status, for a particular cloud-based feature, indicates that the cloud-based feature is unavailable, and accordingly can provide a notification (e.g., a text message, an email, a popup, and/or the like) to a user of microservice monitoring platform 600 and/or another user that indicates the cloud-based feature is unavailable.

The number and arrangement of components shown in FIG. 6 are provided as an example. In practice, microservice monitoring platform 600 can include additional components, fewer components, different components, or differently arranged components than those shown in FIG. 6. Additionally, or alternatively, a set of components (e.g., one or more components) of microservice monitoring platform 600 can perform one or more functions described as being performed by another set of components of microservice monitoring platform 600.

Figure 7:
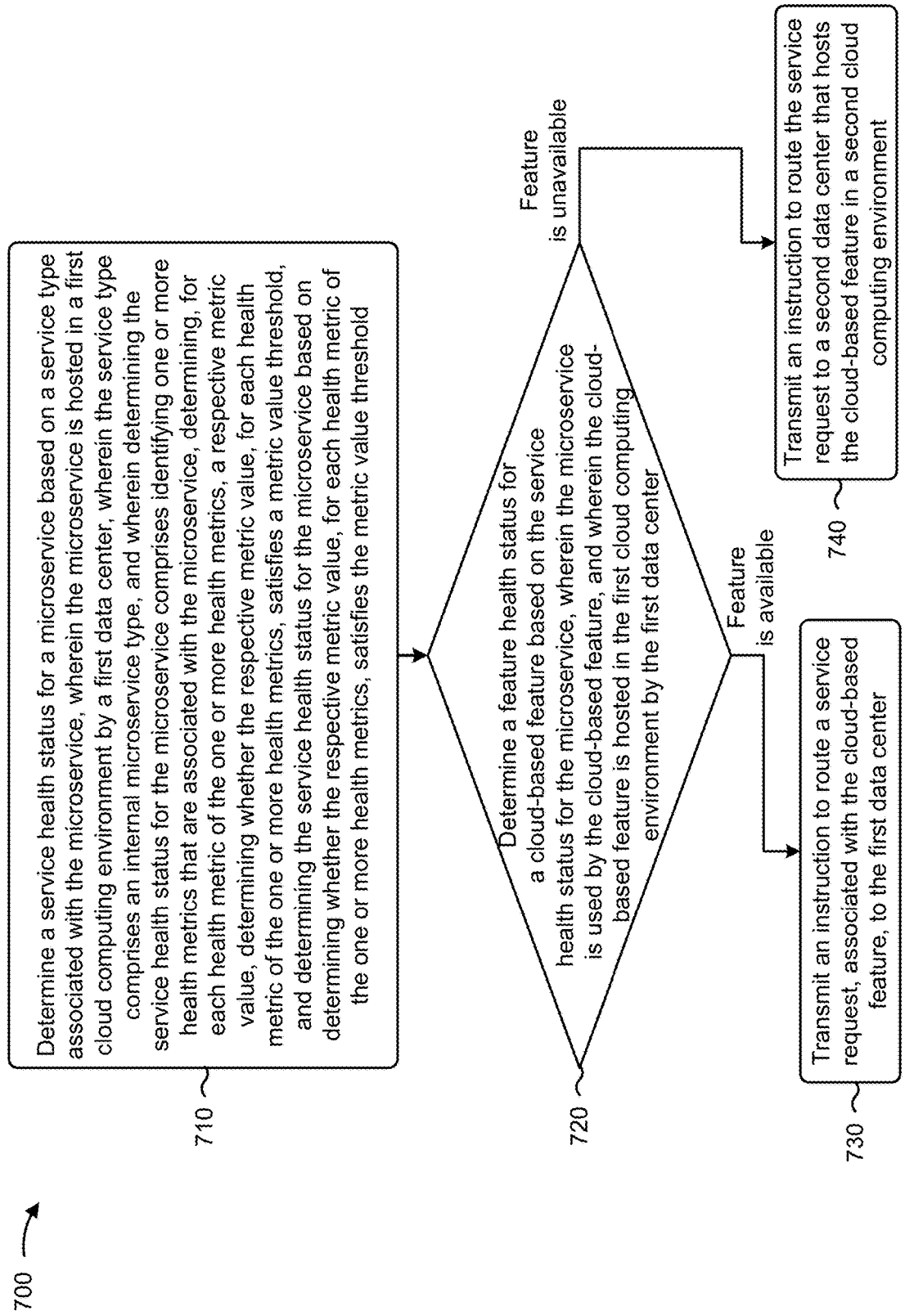
FIG. 7 is a flow chart of an example process for monitoring cloud-based services and/or features.

FIG. 7 is a flow chart of an example process 700 for monitoring cloud-based services and/or features. In some implementations, one or more process blocks of FIG. 7 can be performed by a microservice monitoring platform (e.g., microservice monitoring platform 430, microservice monitoring platform 600, and/or the like). In some implementations, one or more process blocks of FIG. 7 can be performed by another device or a group of devices separate from or including the microservice monitoring platform, such as a client device (e.g., client device 410), a network device (e.g., network device 420), a server device (e.g., server device 450), and/or the like.

As shown in FIG. 7, process 700 can include determining a service health status for a microservice based on a service type associated with the microservice, wherein the microservice is hosted in a first cloud computing environment by a first data center, wherein the service type comprises an internal microservice type, and wherein determining the service health status for the microservice comprises identifying one or more health metrics that are associated with the microservice, determining, for each health metric of the one or more health metrics, a respective metric value, determining whether the respective metric value, for each health metric of the one or more health metrics, satisfies a metric value threshold, and determining the service health status for the microservice based on determining whether the respective metric value, for each health metric of the one or more health metrics, satisfies the metric value threshold (block 710). For example, the microservices monitoring platform (e.g., using computing resource 435, processor 520, memory 530, input component 550, communication interface 570, and/or the like) can determine a service health status for a microservice based on a service type associated with the microservice, as described above in connection with FIGS. 1A-1C, 2A-2C, 3A-3D, 6, and/or the like. In some implementations, the microservice is hosted in a first cloud computing environment by a first data center. In some implementations, the service type comprises an internal microservice type. In some implementations, when determining the service health status for the microservice, the microservice monitoring platform can identify one or more health metrics that are associated with the microservice, can determine, for each health metric of the one or more health metrics, a respective metric value, can determine whether the respective metric value, for each health metric of the one or more health metrics, satisfies a metric value threshold, and can determine the service health status for the microservice based on determining whether the respective metric value, for each health metric of the one or more health metrics, satisfies the metric value threshold.

As further shown in FIG. 7, process 700 can include determining a feature health status for a cloud-based feature based on the service health status for the microservice, wherein the microservice is used by the cloud-based feature, and wherein the cloud-based feature is hosted in the first cloud computing environment by the first data center (block 720). For example, the microservice monitoring platform (e.g., using computing resource 435, processor 520, memory 530, input component 550, communication interface 570, and/or the like) can determine a feature health status for a cloud-based feature based on the service health status for the microservice, as described above in connection with FIGS. 1A-1C, 2A-2C, and/or the like. In some implementations, the microservice is used by the cloud-based feature. In some implementations, the cloud-based feature is hosted in the first cloud computing environment by the first data center.

As further shown in FIG. 7, process 700 can include transmitting, based on determining that the feature health status indicates that the cloud-based feature is available (block 720—Available), an instruction to route a service request, associated with the cloud-based feature, to the first data center (block 730). For example, the microservice monitoring platform (e.g., using computing resource 435, processor 520, memory 530, input component 550, output component 560, communication interface 570, and/or the like) can transmit, based on determining that the feature health status indicates that the cloud-based feature is available, an instruction to route a service request, associated with the cloud-based feature, to the first data center, as described above in connection with FIGS. 1A-1C, 2A-2C, 3A-3D, 6, and/or the like.

As further shown in FIG. 7, process 700 can include transmitting, based on determining that the feature health status indicates that the cloud-based feature is unavailable (block 720—Unavailable), an instruction to route the service request, associated with the cloud-based feature, to a second data center that hosts the cloud-based feature in a second cloud computing environment (block 740). For example, the microservice monitoring platform (e.g., using computing resource 435, processor 520, memory 530, input component 550, output component 560, communication interface 570, and/or the like) can transmit, based on determining that the feature health status indicates that the cloud-based feature is unavailable, an instruction to route the service request, associated with the cloud-based feature, to a second data center that hosts the cloud-based feature in a second cloud computing environment, as described above in connection with FIGS. 1A-1C, 2A-2C, 3A-3D, 6, and/or the like. In some implementations, the microservice is used by the cloud-based feature.

Process 700 can include additional implementations, such as any single implementation or any combination of implementations described below and/or in connection with one or more other processes described elsewhere herein.

In some implementations, when transmitting the instruction to route the service request, the microservice monitoring platform can transmit the instruction to the first data center based on determining that the feature health status indicates that the cloud-based feature hosted in the first cloud computing environment is up, can transmit the instruction to the second data center based on determining that the feature health status associated with the cloud-based feature indicates that the microservice hosted in the first cloud computing environment is down, and/or the like.

In some implementations, the service type is included in a plurality of service types, wherein the plurality of service types comprises the internal microservice type that is associated with a first set of microservices that is hosted in the first cloud computing environment, an external microservice type that is associated with a second set of microservices that is hosted outside of the first cloud computing environment, a resource service type that is associated with a set of resource services that is used by the microservice monitoring platform to monitor at least one of the first set of microservices or the second set of microservices, and/or the like.

In some implementations, the microservices monitoring platform can determine another service health status for another microservice, wherein the other microservice is associated with another service type that comprises an external microservice type, wherein the other microservice is used by the cloud-based feature; and when determining the other service health status for the other microservice, the microservices monitoring platform can attempt to establish a socket connection with the other microservice, can perform a ping test for the other microservice based on determining that the attempt to establish the socket connection with the other microservice was unsuccessful, and can determine the other service health status for the other microservice based on whether the ping test is successful; and when determining the feature health status for the cloud-based feature, the microservice monitoring platform can determine the feature health status for the cloud-based feature based on the other service health status for the other microservice.

In some implementations, the microservice monitoring platform can determine another service health status for another microservice, wherein the other microservice is associated with another service type that comprises a resource service type, wherein the resource service type is associated with a set of resource services that is used by the microservice monitoring platform to monitor a plurality of microservices, wherein the resource service includes one of a database service or a messaging service; when determining the other service health status for the resource service, the microservice monitoring platform can attempt, if the resource service is the database service, a test query the resource service, can transmit, if the resource service is the messaging service, a test message using the resource service, and/or the like; and when determining the feature health status for the cloud-based feature, the microservice monitoring platform can determine the feature health status for the cloud-based feature based on the other service health status for the resource service.

In some implementations, when determining the service health status for the microservice, the microservice monitoring platform can identify one or more dependent microservices, wherein the microservice uses the one or more dependent microservices, can determine a dependent health status for each dependent microservice of the one or more dependent microservices, and can determine the health status for the microservice based on the dependent health status for each dependent microservice of the one or more dependent microservices.

In some implementations, when determining the feature health status for the cloud-based feature, the microservice monitoring platform can determine a respective health status for one or more other microservices that are used by the cloud-based feature, and can determine the feature health status for the cloud-based feature based the respective health status for the one or more other microservices.

Although FIG. 7 shows example blocks of process 700, in some implementations, process 700 can include additional blocks, fewer blocks, different blocks, or differently arranged blocks than those depicted in FIG. 7. Additionally, or alternatively, two or more of the blocks of process 700 can be performed in parallel.

Figure 8:
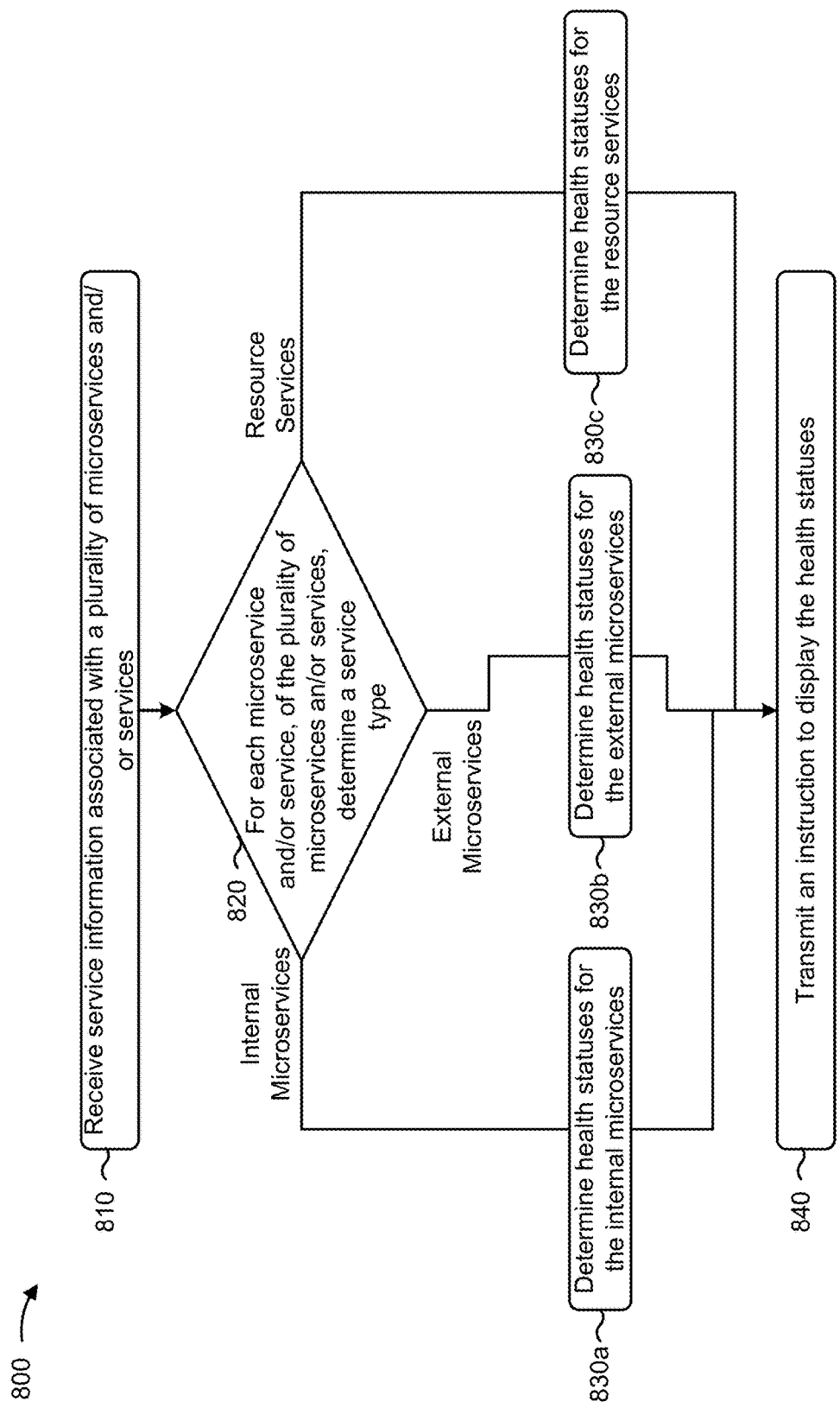
FIG. 8 is a flow chart of an example process for monitoring cloud-based services and/or features.

FIG. 8 is a flow chart of an example process 800 for monitoring cloud-based services and/or features. In some implementations, one or more process blocks of FIG. 8 can be performed by a microservice monitoring platform (e.g., microservice monitoring platform 430, microservice monitoring platform 600, and/or the like). In some implementations, one or more process blocks of FIG. 8 can be performed by another device or a group of devices separate from or including the microservice monitoring platform, such as a client device (e.g., client device 410), a network device (e.g., network device 420), a server device (e.g., server device 450), and/or the like.

As shown in FIG. 8, process 800 can include receiving service information associated with a plurality of microservices and/or services (block 810). For example, the microservices monitoring platform (e.g., using computing resource 435, processor 520, memory 530, input component 550, communication interface 570, and/or the like) can receive service information associated with a plurality of microservices and/or services, as described above in connection with FIGS. 1A-1C, 2A-2C, 3A-3D, 6, and/or the like.

As further shown in FIG. 8, process 800 can include, for each microservice and/or service, of the plurality of microservices and/or services, determining a service type that is associated with the microservice and/or service (block 820). For example, the microservice monitoring platform (e.g., using computing resource 435, processor 520, memory 530, input component 550, communication interface 570, and/or the like) can, for each microservice and/or service, of the plurality of microservices and/or services, determine a service type that is associated with the microservice and/or service, as described above in connection with FIGS.

1A-1C, 2A-2C, 3A-3D, 6, and/or the like. In some implementations, the service type to which a particular microservice and/or service is associated can be included in a plurality of service types. In some implementations, the plurality of service types can include an internal microservice type, an external microservice type, a resource service type, and/or the like.

As further shown in FIG. 8, process 800 can include determining health statuses for the plurality of microservices and/or services, in the different service types in parallel (blocks 830a-830c). For example, the microservice monitoring platform (e.g., using computing resource 435, processor 520, memory 530, input component 550, output component 560, communication interface 570, and/or the like) can determine service health statuses for the plurality of microservices and/or services, in the different microservice types in parallel, as described above in connection with FIGS. 1A-1C, 2A-2C, 3A-3D, 6, and/or the like. For example, the microservice monitoring platform can determine, in parallel, a health status for a first microservice that is associated with the internal microservice type (block 830a), a health status for a second microservice that is associated with the external microservice type (block 830b), and a health status for a service that is associated with the resource service type (block 830c).

As further shown in FIG. 8, process 800 can include transmitting, to a client device, an instruction to display the health statuses of the plurality of microservices and/or services (block 840). For example, the microservice monitoring platform (e.g., using computing resource 435, processor 520, memory 530, input component 550, output component 560, communication interface 570, and/or the like) can transmit, to a client device, an instruction to display the health statuses of the plurality of microservices and/or services, as described above in connection with FIGS. 1A-1C, 2A-2C, 3A-3D, 6, and/or the like.

Process 800 can include additional implementations, such as any single implementation or any combination of implementations described below and/or in connection with one or more other processes described elsewhere herein. Although FIG. 8 shows example blocks of process 800, in some implementations, process 800 can include additional blocks, fewer blocks, different blocks, or differently arranged blocks than those depicted in FIG. 8. Additionally, or alternatively, two or more of the blocks of process 800 can be performed in parallel.

Figure 9:
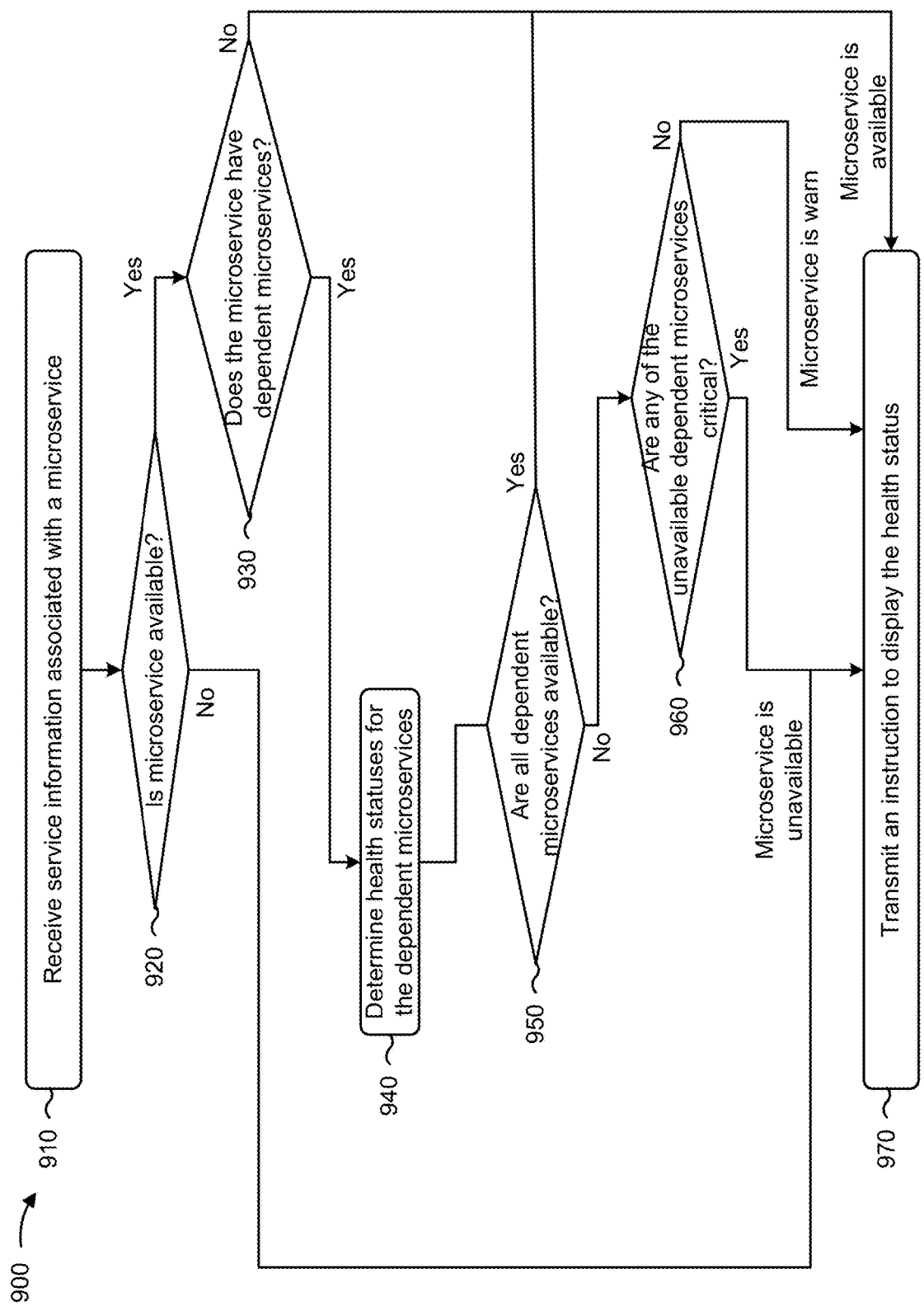
FIG. 9 is a flow chart of an example process for monitoring cloud-based services and/or features.

FIG. 9 is a flow chart of an example process 900 for monitoring cloud-based services and/or features. In some implementations, one or more process blocks of FIG. 9 can be performed by a microservice monitoring platform (e.g., microservice monitoring platform 430, microservice monitoring platform 600, and/or the like). In some implementations, one or more process blocks of FIG. 9 can be performed by another device or a group of devices separate from or including the microservice monitoring platform, such as a client device (e.g., client device 410), a network device (e.g., network device 420), a server device (e.g., server device 450), and/or the like.

As shown in FIG. 9, process 900 can include receiving service information associated with a microservice (block 910). For example, the microservices monitoring platform (e.g., using computing resource 435, processor 520, memory 530, input component 550, output component 560, communication interface 570, and/or the like) can receive service information associated with a microservice, as described above in connection with FIGS. 1A-1C, 2A-2C, 3A-3D, 6, and/or the like.

As further shown in FIG. 9, process 900 can include determining whether the microservice is available (block 920). For example, the microservice monitoring platform (e.g., using computing resource 435, processor 520, memory 530, input component 550, output component 560, communication interface 570, and/or the like) can determine whether the microservice is available, as described above in connection with FIGS. 1A-1C, 2A-2C, 3A-3D, 6, and/or the like.

As further shown in FIG. 9, if the microservice monitoring platform determines that the microservice is unavailable (block 920—No), process 900 can include transmitting an instruction to display the health status of the microservice (block 970). For example, the microservice monitoring platform (e.g., using computing resource 435, processor 520, memory 530, input component 550, output component 560, communication interface 570, and/or the like) can transmit an instruction to display the health status of the microservice, as described above in connection with FIGS. 1A-1C, 2A-2C, 3A-3D, 6, and/or the like. In some implementations, the instruction can include an instruction to display the health status such that the health status indicates that the microservice is unavailable.

As further shown in FIG. 9, if the microservice monitoring platform determines that the microservice is available (block 920—Yes), process 900 can include determining whether the microservice has dependent microservices (block 930). For example, the microservice monitoring platform (e.g., using computing resource 435, processor 520, memory 530, input component 550, output component 560, communication interface 570, and/or the like) can determine whether the microservice has dependent microservices, as described above in connection with FIGS. 1A-1C, 2A-2C, 3A-3D, 6, and/or the like.

As further shown in FIG. 9, if the microservice monitoring platform determines that the microservice does not have dependent microservices (block 930—No), process 900 can include transmitting an instruction to display the health status of the microservice (block 970). In some implementations, the instruction can include an instruction to display the health status such that the health status indicates that the microservice is available.

As further shown in FIG. 9, if the microservice monitoring platform determines that the microservice has dependent microservices (block 930—Yes), process 900 can include determining health statuses for the dependent microservices (block 940). For example, the microservice monitoring platform (e.g., using computing resource 435, processor 520, memory 530, input component 550, output component 560, communication interface 570, and/or the like) can determine health statuses for the dependent microservices, as described above in connection with FIGS. 1A-1C, 2A-2C, 3A-3D, 6, and/or the like.

As further shown in FIG. 9, process 900 can include determining whether all of the dependent microservices are available (block 950). For example, the microservice monitoring platform (e.g., using computing resource 435, processor 520, memory 530, input component 550, output component 560, communication interface 570, and/or the like) can determine whether all of the dependent microservices are available, as described above in connection with FIGS. 1A-1C, 2A-2C, 3A-3D, 6, and/or the like.

As further shown in FIG. 9, if the microservice monitoring platform determines that all dependent microservices are available (block 950—Yes), process 900 can include transmitting an instruction to display the health status of the microservice (block 970). In some implementations, the instruction can include an instruction to display the health status such that the health status indicates that the microservice is available.

As further shown in FIG. 9, if the microservice monitoring platform determines that one or more of the dependent microservices are unavailable (block 950—No), process 900 can include determining whether any of the unavailable dependent microservices are critical to the operation of the microservice (block 960). For example, the microservice monitoring platform (e.g., using computing resource 435, processor 520, memory 530, input component 550, output component 560, communication interface 570, and/or the like) can determine whether any of the unavailable dependent microservices are critical to the operation of the microservice, as described above in connection with FIGS. 1A-1C, 2A-2C, 3A-3D, 6, and/or the like.

As further shown in FIG. 9, if the microservice monitoring platform determines that any of the unavailable dependent microservices are critical to the operation of the microservice (block 960—Yes), process 900 can include transmitting an instruction to display the health status of the microservice (block 970). In some implementations, the instruction can include an instruction to display the health status such that the health status indicates that the microservice is unavailable.

As further shown in FIG. 9, if the microservice monitoring platform determines that no unavailable dependent microservices are critical to the operation of the microservice (block 960—Yes), process 900 can include transmitting an instruction to display the health status of the microservice (block 970). In some implementations, the instruction can include an instruction to display the health status such that the health status indicates that the microservice is warn.

Process 900 can include additional implementations, such as any single implementation or any combination of implementations described below and/or in connection with one or more other processes described elsewhere herein. Although FIG. 9 shows example blocks of process 900, in some implementations, process 900 can include additional blocks, fewer blocks, different blocks, or differently arranged blocks than those depicted in FIG. 9. Additionally, or alternatively, two or more of the blocks of process 900 can be performed in parallel.

Figure 10:
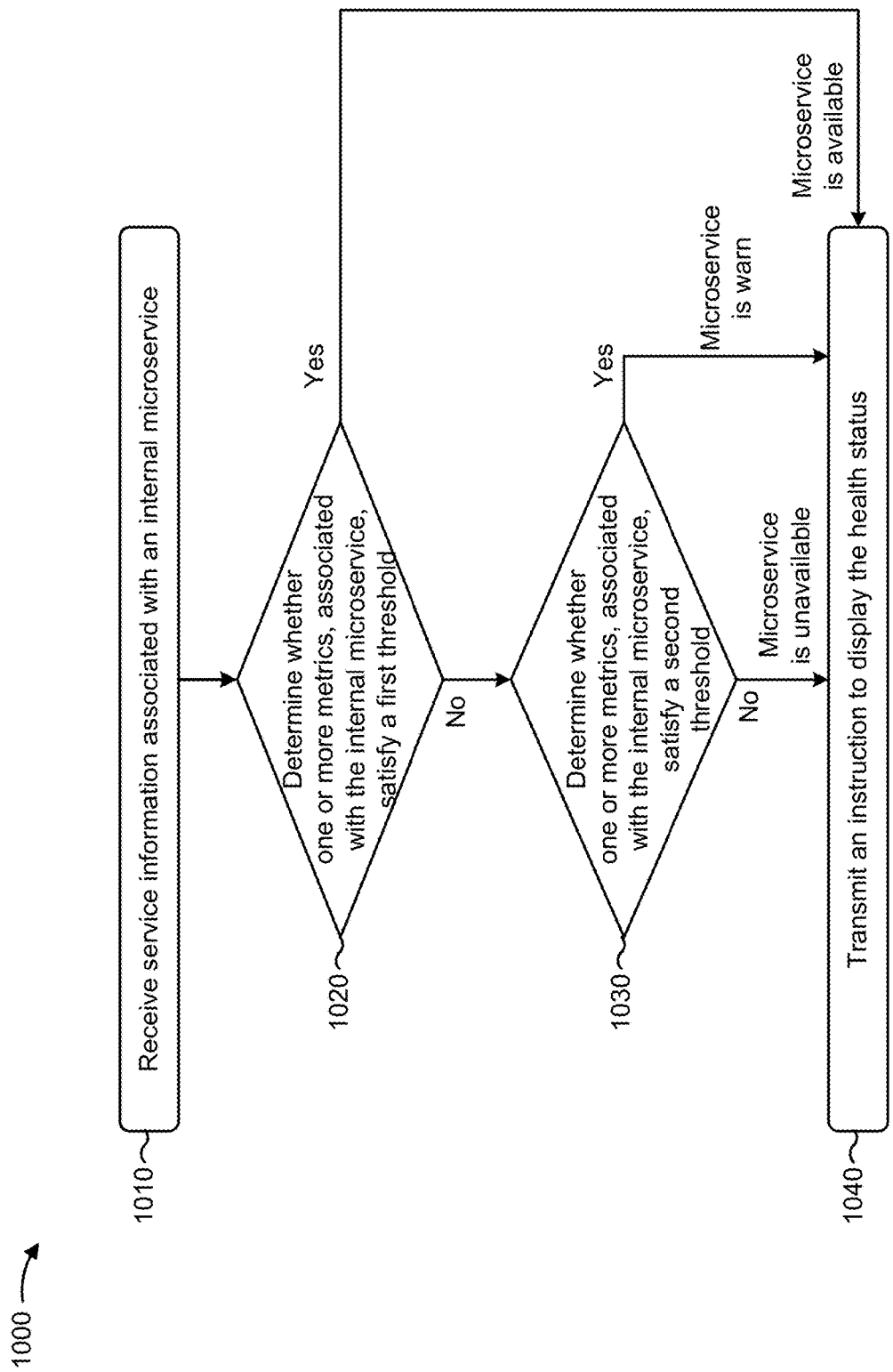
FIG. 10 is a flow chart of an example process for monitoring cloud-based services and/or features.

FIG. 10 is a flow chart of an example process 1000 for monitoring cloud-based services and/or features. In some implementations, one or more process blocks of FIG. 10 can be performed by a microservice monitoring platform (e.g., microservice monitoring platform 430, microservice monitoring platform 600, and/or the like). In some implementations, one or more process blocks of FIG. 10 can be performed by another device or a group of devices separate from or including the microservice monitoring platform, such as a client device (e.g., client device 410), a network device (e.g., network device 420), a server device (e.g., server device 45), and/or the like.

As shown in FIG. 10, process 1000 can include receiving service information associated with an internal microservice (block 1010). For example, the microservices monitoring platform (e.g., using computing resource 435, processor 520, memory 530, input component 550, output component 560, communication interface 570, and/or the like) can receive service information associated with an internal microservice, as described above in connection with FIGS. 1A-1C, 2A-2C, 3A-3D, 6, and/or the like.

As further shown in FIG. 10, process 1000 can include determining whether one or more metrics, associated with the internal microservice, satisfy a first threshold (block 1020). For example, the microservice monitoring platform (e.g., using computing resource 435, processor 520, memory 530, input component 550, output component 560, communication interface 570, and/or the like) can determine whether one or more metrics, associated with the internal microservice, satisfy a first threshold, as described above in connection with FIGS. 1A-1C, 2A-2C, 3A-3D, 6, and/or the like. In some implementations the microservice monitoring platform can determine whether each metric, of the one or more metrics, satisfies the same threshold, satisfies different respective thresholds, and/or the like.

As further shown in FIG. 10, if the microservice monitoring platform determines that the one or more metrics satisfy the first threshold (block 1020—Yes), process 1000 can include transmitting an instruction to display the health status of the internal microservice (block 1040). For example, the microservice monitoring platform (e.g., using computing resource 435, processor 520, memory 530, input component 550, output component 560, communication interface 570, and/or the like) can transmit an instruction to display the health status of the internal microservice, as described above in connection with FIGS. 1A-1C, 2A-2C, 3A-3D, 6, and/or the like. In some implementations, the instruction can include an instruction to display the health status such that the health status indicates that the internal microservice is available.

As further shown in FIG. 10, if the microservice monitoring platform determines that any of the one or more metrics do not satisfy the first threshold (block 1020—No), process 1000 can include determining whether the one or more metrics, that do not satisfy the first threshold, satisfy a second threshold (block 1030). For example, the microservice monitoring platform (e.g., using computing resource 435, processor 520, memory 530, input component 550, output component 560, communication interface 570, and/or the like) can determine whether the one or more metrics, that do not satisfy the first threshold, satisfy a second threshold, as described above in connection with FIGS. 1A-1C, 2A-2C, 3A-3D, 6, and/or the like. In some implementations the microservice monitoring platform can determine whether each metric, of the one or more metrics, satisfies the same threshold, satisfies different respective thresholds, and/or the like.

As further shown in FIG. 10, if the microservice monitoring platform determines that the one or more metrics, that do not satisfy the first threshold, satisfy the second threshold (block 1030—Yes), process 1000 can include transmitting an instruction to display the health status of the internal microservice (block 1040). In some implementations, the instruction can include an instruction to display the health status such that the health status indicates that the internal microservice is warn.

As further shown in FIG. 10, if the microservice monitoring platform determines that any of the one or more metrics do not satisfy the first threshold or the second threshold (block 1030—No), process 1000 can include transmitting an instruction to display the health status of the internal microservice (block 1040). In some implementations, the instruction can include an instruction to display the health status such that the health status indicates that the internal microservice is unavailable.

Process 1000 can include additional implementations, such as any single implementation or any combination of implementations described below and/or in connection with one or more other processes described elsewhere herein. Although FIG. 10 shows example blocks of process 1000, in some implementations, process 1000 can include additional blocks, fewer blocks, different blocks, or differently arranged blocks than those depicted in FIG. 10. Additionally, or alternatively, two or more of the blocks of process 1000 can be performed in parallel.

Figure 11:
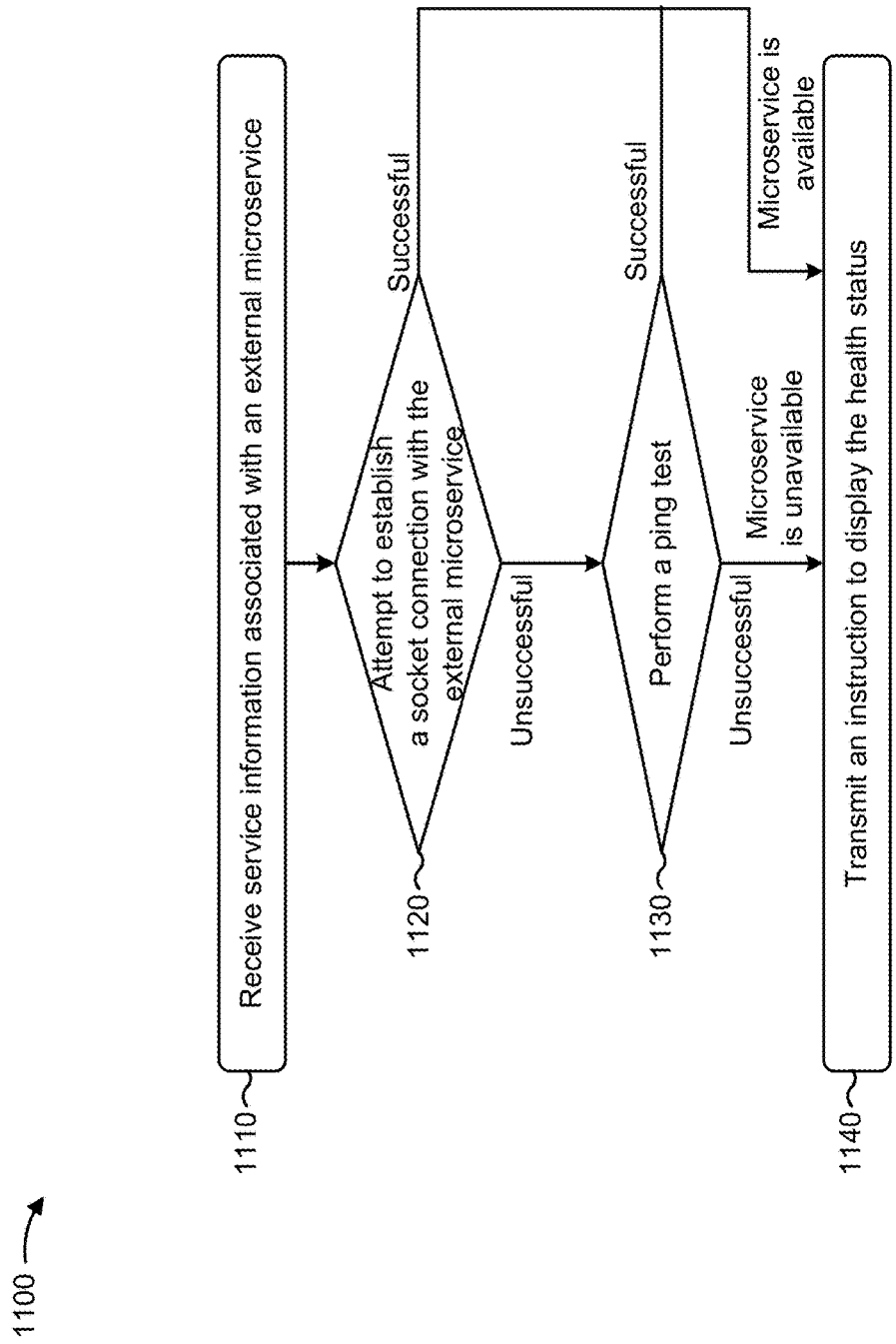
FIG. 11 is a flow chart of an example process for monitoring cloud-based services and/or features.

FIG. 11 is a flow chart of an example process 1100 for monitoring cloud-based services and/or features. In some implementations, one or more process blocks of FIG. 11 can be performed by a microservice monitoring platform (e.g., microservice monitoring platform 430, microservice monitoring platform 600, and/or the like). In some implementations, one or more process blocks of FIG. 11 can be performed by another device or a group of devices separate from or including the microservice monitoring platform, such as a client device (e.g., client device 410), a network device (e.g., network device 420), a server device (e.g., server device 450), and/or the like.

As shown in FIG. 11, process 1100 can include receiving service information associated with an external microservice (block 1110). For example, the microservices monitoring platform (e.g., using computing resource 435, processor 520, memory 530, input component 550, output component 560, communication interface 570, and/or the like) can receive service information associated with an external microservice, as described above in connection with FIGS. 1A-1C, 2A-2C, 3A-3D, 6, and/or the like.

As further shown in FIG. 11, process 1100 can include attempting to establish a socket connection with the external microservice (block 1120). For example, the microservice monitoring platform (e.g., using computing resource 435, processor 520, memory 530, input component 550, output component 560, communication interface 570, and/or the like) can attempt to establish a socket connection with the external microservice, as described above in connection with FIGS. 1A-1C, 2A-2C, 3A-3D, 6, and/or the like.

As further shown in FIG. 11, if the microservice monitoring platform determines that the microservice monitoring platform is able to establish the socket connection with the external microservice (block 1120—Successful), process 1100 can include transmitting an instruction to display the health status of the external microservice (block 1140). For example, the microservice monitoring platform (e.g., using computing resource 435, processor 520, memory 530, input component 550, output component 560, communication interface 570, and/or the like) can transmit an instruction to display the health status of the external microservice, as described above in connection with FIGS. 1A-1C, 2A-2C, 3A-3D, 6, and/or the like. In some implementations, the instruction can include an instruction to display the health status such that the health status indicates that the external microservice is available.

As further shown in FIG. 11, if the microservice monitoring platform determines that the microservice monitoring platform is unable to establish the socket connection with the external microservice (block 1120—Unsuccessful), process 1100 can include performing a ping test for the external microservice (block 1130). For example, the microservice monitoring platform (e.g., using computing resource 435, processor 520, memory 530, input component 550, output component 560, communication interface 570, and/or the like) can perform a ping test for the external microservice platform, as described above in connection with FIGS. 1A-1C, 2A-2C, 3A-3D, 6, and/or the like.

As further shown in FIG. 11, if the microservice monitoring platform determines that the ping test for the external microservice is successful (block 1130—Successful), process 1100 can include transmitting an instruction to display the health status of the external microservice (block 1140). In some implementations, the instruction can include an instruction to display the health status such that the health status indicates that the external microservice is available.

As further shown in FIG. 11, if the microservice monitoring platform determines that the ping test for the external microservice is unsuccessful (block 1130—Unsuccessful), process 1100 can include transmitting an instruction to display the health status of the external microservice (block 1140). In some implementations, the instruction can include an instruction to display the health status such that the health status indicates that the external microservice is unavailable.

Process 1100 can include additional implementations, such as any single implementation or any combination of implementations described below and/or in connection with one or more other processes described elsewhere herein. Although FIG. 11 shows example blocks of process 1100, in some implementations, process 1100 can include additional blocks, fewer blocks, different blocks, or differently arranged blocks than those depicted in FIG. 11. Additionally, or alternatively, two or more of the blocks of process 1100 can be performed in parallel.

Figure 12:
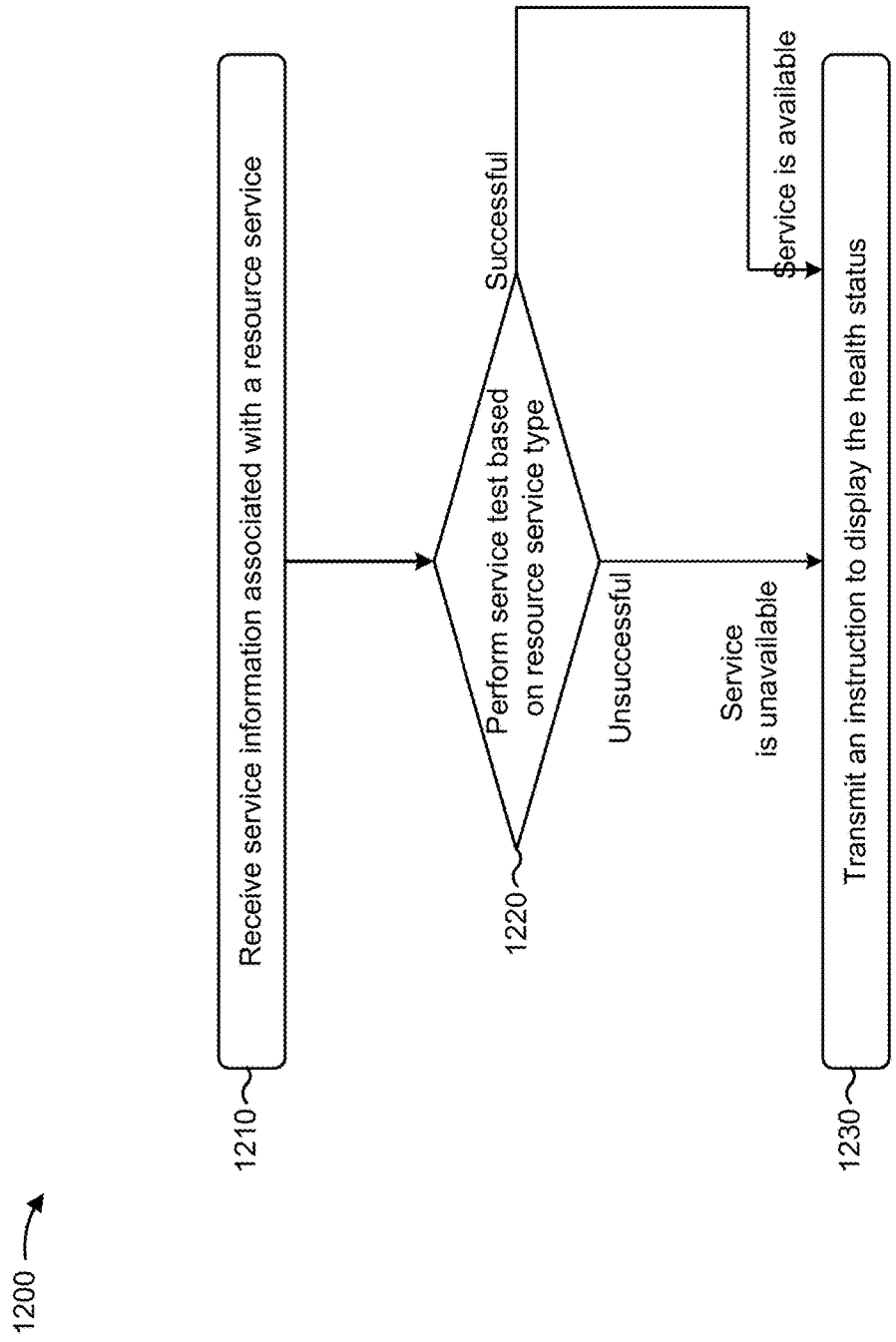
FIG. 12 is a flow chart of an example process for monitoring cloud-based services and/or features.

FIG. 12 is a flow chart of an example process 1200 for monitoring cloud-based services and/or features. In some implementations, one or more process blocks of FIG. 12 can be performed by a microservice monitoring platform (e.g., microservice monitoring platform 430, microservice monitoring platform 600, and/or the like). In some implementations, one or more process blocks of FIG. 12 can be performed by another device or a group of devices separate from or including the microservice monitoring platform, such as a client device (e.g., client device 410), a network device (e.g., network device 420), a server device (e.g., server device 450), and/or the like.

As shown in FIG. 12, process 1200 can include receiving service information associated with a resource service (block 1210). For example, the microservices monitoring platform (e.g., using computing resource 435, processor 520, memory 530, input component 550, output component 560, communication interface 570, and/or the like) can receive service information associated with a resource service, as described above in connection with FIGS. 1A-1C, 2A-2C, 3A-3D, 6, and/or the like.

As further shown in FIG. 12, process 1200 can include performing a service test based on a resource service type associated with the resource service (block 1220). For example, the microservice monitoring platform (e.g., using computing resource 435, processor 520, memory 530, input component 550, output component 560, communication interface 570, and/or the like) can perform a service test based on a resource service type associated with the resource service, as described above in connection with FIGS. 1A-1C, 2A-2C, 3A-3D, 6, and/or the like. In some implementations, the resource service can include a database service, and the service test can include performing a test query on the database service. In some implementations, the resource service can include a messaging service, and the service test can include transmitting a test message using the messaging service.

As further shown in FIG. 12, process 1200 can include transmitting an instruction to display the health status of the resource service (block 1230). For example, the microservice monitoring platform (e.g., using computing resource 435, processor 520, memory 530, input component 550, output component 560, communication interface 570, and/or the like) can transmit an instruction to display the health status of the resource service, as described above in connection with FIGS. 1A-1C, 2A-2C, 3A-3D, 6, and/or the like. In some implementations, if the microservice monitoring platform determines that the service test is successful (block 1220—Successful), the instruction can include an instruction to display the health status such that the health status indicates that the resource service is available. In some implementations, if the microservice monitoring platform determines that the service test is unsuccessful (block 1220—Unsuccessful), the instruction can include an instruction to display the health status such that the health status indicates that the resource service is unavailable.

Process 1200 can include additional implementations, such as any single implementation or any combination of implementations described below and/or in connection with one or more other processes described elsewhere herein. Although FIG. 12 shows example blocks of process 1200, in some implementations, process 1200 can include additional blocks, fewer blocks, different blocks, or differently arranged blocks than those depicted in FIG. 12. Additionally, or alternatively, two or more of the blocks of process 1200 can be performed in parallel.

Figure 13:
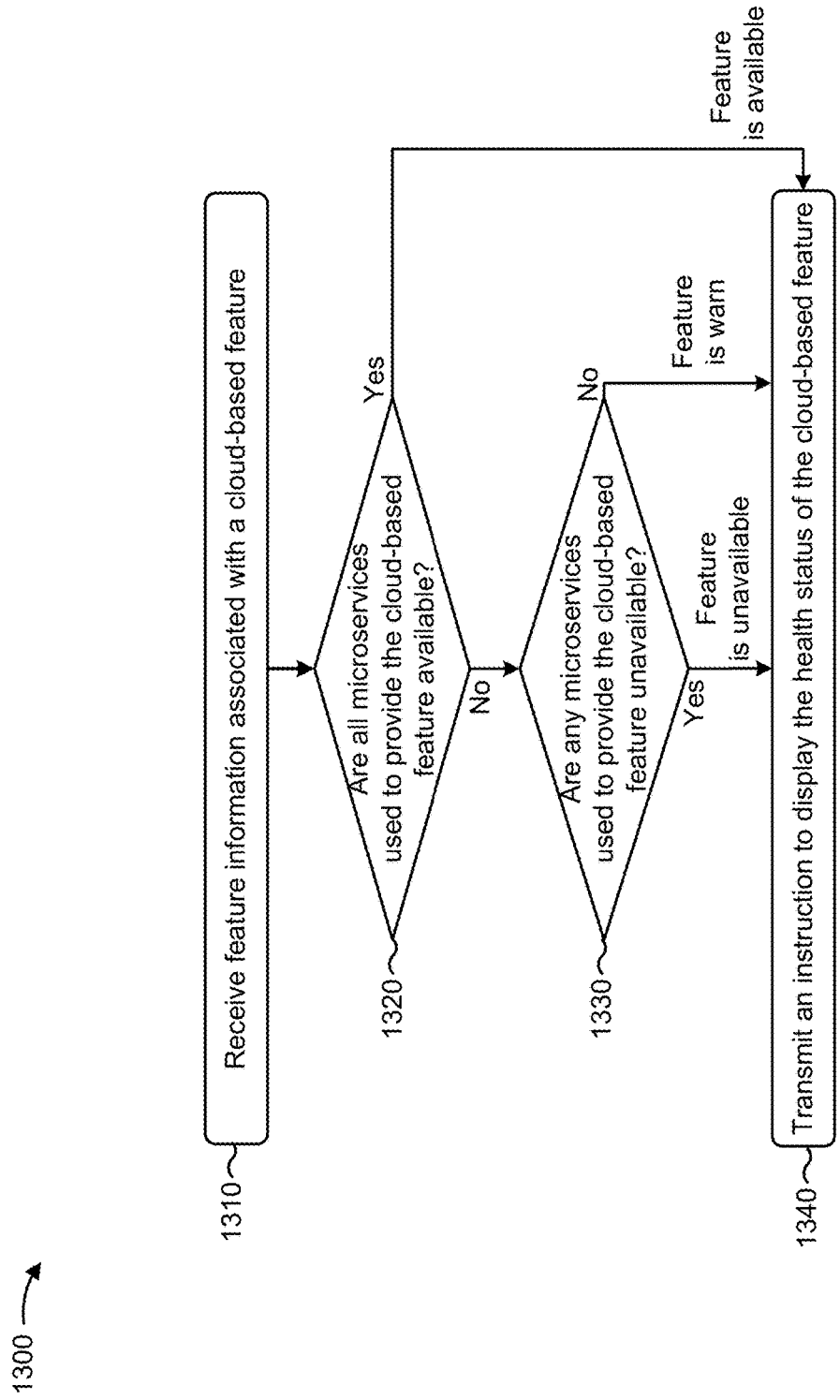
FIG. 13 is a flow chart of an example process for monitoring cloud-based services and/or features.

FIG. 13 is a flow chart of an example process 1300 for monitoring cloud-based services and/or features. In some implementations, one or more process blocks of FIG. 13 can be performed by a microservice monitoring platform (e.g., microservice monitoring platform 430, microservice monitoring platform 600, and/or the like). In some implementations, one or more process blocks of FIG. 13 can be performed by another device or a group of devices separate from or including the microservice monitoring platform, such as a client device (e.g., client device 410), a network device (e.g., network device 420), a server device (e.g., server device 450), and/or the like.

As shown in FIG. 13, process 1300 can include receiving feature information associated with a cloud-based feature (block 1310). For example, the microservices monitoring platform (e.g., using computing resource 435, processor 520, memory 530, input component 550, output component 560, communication interface 570, and/or the like) can receive feature information associated with a cloud-based feature, as described above in connection with FIGS. 1A-1C, 2A-2C, 3A-3D, 6, and/or the like.

As further shown in FIG. 13, process 1300 can include determining whether all of the microservices, that are used to provide the cloud-based feature, are available (block 1320). For example, the microservice monitoring platform (e.g., using computing resource 435, processor 520, memory 530, input component 550, output component 560, communication interface 570, and/or the like) can determine whether all of the microservices, that are used to provide the cloud-based feature, are available, as described above in connection with FIGS. 1A-1C, 2A-2C, 3A-3D, 6, and/or the like.

As further shown in FIG. 13, if the microservice monitoring platform determines that all of the microservices, that are used to provide the cloud-based feature, are available (block 1320—Yes), process 1300 can include transmitting an instruction to display the health status of the cloud-based feature (block 1340). For example, the microservice monitoring platform (e.g., using computing resource 435, processor 520, memory 530, input component 550, output component 560, communication interface 570, and/or the like) can transmit an instruction to display the health status of the cloud-based feature, as described above in connection with FIGS. 1A-1C, 2A-2C, 3A-3D, 6, and/or the like. In some implementations, the instruction can include an instruction to display the health status such that the health status indicates that the cloud-based feature is available.

As further shown in FIG. 13, if the microservice monitoring platform determines that not all of the microservices, that are used to provide the cloud-based service, are available (block 1320—No), process 1300 can include determining whether any of the microservices, that are used to provide the cloud-based service, are unavailable (block 1330). For example, the microservice monitoring platform (e.g., using computing resource 435, processor 520, memory 530, input component 550, output component 560, communication interface 570, and/or the like) can determine whether any of the microservices, that are used to provide the cloud-based service, are unavailable, as described above in connection with FIGS. 1A-1C, 2A-2C, 3A-3D, 6, and/or the like.

As further shown in FIG. 13, if the microservice monitoring platform determines that any of the microservices, that are used to provide the cloud-based service, are not unavailable (block 1130—No), process 1300 can include transmitting an instruction to display the health status of the cloud-based feature (block 1340). In some implementations, the instruction can include an instruction to display the health status such that the health status indicates that the cloud-based feature is warn.

As further shown in FIG. 13, if the microservice monitoring platform determines that one or more of the microservices, that are used to provide the cloud-based service, are unavailable (block 1130—Yes), process 1300 can include transmitting an instruction to display the health status of the cloud-based feature (block 1340). In some implementations, the instruction can include an instruction to display the health status such that the health status indicates that the cloud-based feature is unavailable.

Process 1300 can include additional implementations, such as any single implementation or any combination of implementations described below and/or in connection with one or more other processes described elsewhere herein. Although FIG. 13 shows example blocks of process 1300, in some implementations, process 1300 can include additional blocks, fewer blocks, different blocks, or differently arranged blocks than those depicted in FIG. 13. Additionally, or alternatively, two or more of the blocks of process 1300 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain client interfaces have been described herein and/or shown in the figures. A client interface can include a graphical client interface, a non-graphical client interface, a text-based client interface, or the like. A client interface can provide information for display. In some implementations, a client can interact with the information, such as by providing input via an input component of a device that provides the client interface for display. In some implementations, a client interface can be configurable by a device and/or a client (e.g., a client can change the size of the client interface, information provided via the client interface, a position of information provided via the client interface, etc.). Additionally, or alternatively, a client interface can be pre-configured to a standard configuration, a specific configuration based on a type of device on which the client interface is displayed, and/or a set of configurations based on capabilities and/or specifications associated with a device on which the client interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a microservice monitoring platform, a service health status for a microservice based on a service type associated with the microservice,
   wherein the microservice is hosted in a first cloud computing environment by a first data center,
   wherein the service type comprises an internal microservice type, and
   wherein determining the service health status for the microservice comprises:
      identifying one or more health metrics that are associated with the microservice,
      determining, for each health metric of the one or more health metrics, a respective metric value,
      determining whether the respective metric value, for each health metric of the one or more health metrics, satisfies a metric value threshold,
      identifying one or more dependent microservices,
         wherein the microservice uses the one or more dependent microservices,
      determining a dependent service health status for each dependent microservice of the one or more dependent microservices, and
      determining the service health status for the microservice based on determining whether the respective metric value, for each health metric of the one or more health metrics, satisfies the metric value threshold and based on the dependent service health status for each dependent microservice of the one or more dependent microservices,
         wherein the microservice is determined to be unavailable if one of the one or more dependent microservices is determined to be critical and unavailable;
   determining, by the microservice monitoring platform, a feature health status for a cloud-based feature based on the service health status for a plurality of microservices,
      wherein the plurality of microservices are used by the cloud-based feature, and
      wherein the cloud-based feature is hosted in the first cloud computing environment by the first data center;
   transmitting, by the microservice monitoring platform and to a client device, information identifying service health statuses for the plurality of microservices and information identifying the feature health status for the cloud-based feature,
      wherein the service health statuses for the plurality of microservices are displayable based on at least one of:
         a region of a respective microservice,
         a category of a respective microservice, or
         a type of a respective microservice; and
   transmitting, by the microservice monitoring platform and based on the feature health status, an instruction to route a service request, associated with the cloud-based feature, to one of:
      the first data center, or
      a second data center that hosts the cloud-based feature in a second cloud computing environment.

2. The method of claim 1, wherein transmitting the instruction to route the service request comprises:
   transmitting the instruction to the first data center based on determining that the feature health status indicates that the cloud-based feature hosted in the first cloud computing environment is up, or
   transmitting the instruction to the second data center based on determining that the feature health status associated with the cloud-based feature indicates that the microservice hosted in the first cloud computing environment is down.

3. The method of claim 1, wherein the service type is included in a plurality of service types,
   wherein the plurality of service types comprises:
      the internal microservice type that is associated with a first set of microservices that is hosted in the first cloud computing environment;
      an external microservice type that is associated with a second set of microservices that is hosted outside of the first cloud computing environment; and
      a resource service type that is associated with a set of services that is used by the microservice monitoring platform to monitor at least one of:
         the first set of microservices, or
         the second set of microservices.

4. The method of claim 1, further comprising:
   determining another service health status for another microservice,
      wherein the other microservice is associated with another service type that comprises an external microservice type,
      wherein the other microservice is used by the cloud-based feature, and
      wherein determining the other service health status for the other microservice comprises:
         attempting to establish a socket connection with the other microservice, performing a ping test for the other microservice based on determining that the attempt to establish the socket connection with the other microservice was unsuccessful, and
         determining the other service health status for the other microservice based on whether the ping test is successful; and
   wherein determining the feature health status for the cloud-based feature comprises:
      determining the feature health status for the cloud-based feature based on the other service health status for the other microservice.

5. The method of claim 1, further comprising:
   determining another service health status for a resource service,
      wherein the resource service is associated with another service type that comprises a resource service type,
      wherein the resource service type is associated with a set of microservices that is used by the microservice monitoring platform to monitor a another plurality of microservices,
      wherein the resource service includes one of:
         a database service, or
         a messaging service, and
      wherein determining the other service health status for the resource service comprises at least one of:
         performing, if the resource service is the database service, a test query on the resource service, or
         transmitting, if the resource service is the messaging service, a test message using the resource service; and
   wherein determining the feature health status for the cloud-based feature comprises:
      determining the feature health status for the cloud-based feature based on the other service health status for the resource service.

6. The method of claim 1, wherein determining the feature health status for the cloud-based feature comprises:
   determining a respective service health status for one or more other microservices that are used by the cloud-based feature, and
   determining the feature health status for the cloud-based feature based the respective service health status for the one or more other microservices.

7. A microservice monitoring platform, comprising:
   one or more memories; and
   one or more processors, communicatively coupled to the one or more memories, to:
      determine a service health status for a microservice based on a service type associated with the microservice,
         wherein the microservice is hosted in a first cloud computing environment by a first data center,
         wherein the service type comprises an internal microservice type, and
         wherein the one or more processors, when determining the service health status for the microservice, are to:
            identify one or more health metrics that are associated with the microservice,
            determine, for each health metric of the one or more health metrics, a respective metric value,
            determine whether the respective metric value, for each health metric of the one or more health metrics, satisfies a metric value threshold,
            identify one or more dependent microservices,
               wherein the microservice uses the one or more dependent microservices,
            determine a dependent service health status for each dependent microservice of the one or more dependent microservices, and
         determine the service health status for the microservice based on determining whether the respective metric value, for each health metric of the one or more health metrics, satisfies the metric value threshold and based on the dependent service health status for each dependent microservice of the one or more dependent microservices,
            wherein the microservice is determined to be unavailable if one of the dependent microservices is determined to be critical and unavailable;
      determine a feature health status for a cloud-based feature based on the service health status for a plurality of microservices,
         wherein the plurality of microservices are used by the cloud-based feature,
         wherein the cloud-based feature is hosted in the first cloud computing environment by the first data center, and
         wherein the cloud-based feature is based on the one or more dependent services;
      transmit, to a client device, information identifying service health statuses for the plurality of microservices and information identifying the feature health status for the cloud-based feature,
         wherein the service health statuses for the plurality of microservices are displayable based on at least one of:
            a region of a respective microservice,
            a category of a respective microservice, or
            a type of a respective microservice; and
      transmit, based on the feature health status, an instruction to route a service request, associated with the cloud-based feature, to one of:
         the first data center, or
         a second data center that hosts the cloud-based feature in a second cloud computing environment.

8. The microservice monitoring platform of claim 7, wherein the one or more processors, when transmitting the instruction to route the service request, are to:
   transmit the instruction to the first data center based on determining that the feature health status indicates that the cloud-based feature hosted in the first cloud computing environment is up, or
   transmit the instruction to the second data center based on determining that the feature health status associated with the cloud-based feature indicates that the microservice hosted in the first cloud computing environment is down.

9. The microservice monitoring platform of claim 7, wherein the service type is included in a plurality of service types,
   wherein the plurality of service types comprises:
      the internal microservice type that is associated with a first set of microservices that is hosted in the first cloud computing environment;
      an external microservice type that is associated with a second set of microservices that is hosted outside of the first cloud computing environment; and
      a resource service type that is associated with a set of services that is used by the microservice monitoring platform to monitor at least one of:
         the first set of microservices, or
         the second set of microservices.

10. The microservice monitoring platform of claim 7, wherein the one or more processors are further configured to:
   determine another service health status for another microservice,
      wherein the other microservice is associated with another service type that comprises an external microservice type,
      wherein the other microservice is used by the cloud-based feature, and
      wherein the one or more processors, when determining the other service health status for the other microservice, are to:
         attempt to establish a socket connection with the other microservice,
         perform a ping test for the other microservice based on determining that the attempt to establish the socket connection with the other microservice was unsuccessful, and
         determine the other service health status for the other microservice based on whether the ping test is successful; and
   wherein the one or more processors, when determining the feature health status for the cloud-based feature, are to:
      determine the feature health status for the cloud-based feature based on the other service health status for the other microservice.

11. The microservice monitoring platform of claim 7, wherein the one or more processors are further configured to:
   determine another service health status for a resource service,
      wherein the resource service is associated with service type that comprises a resource service type,
      wherein the resource service type is associated with a set of services that is used by the microservice monitoring platform to monitor the plurality of microservices,
      wherein the resource service includes one of:
         a database service, or
         a messaging service, and
      wherein the one or more processors, when determining the other service health status for the resource service, are to at least one of:
         attempt, if the resource service is the database service, a test query the resource service, or
         transmit, if the resource service is the messaging service, a test message using the resource service; and
   wherein the one or more processors, when determining the feature health status for the cloud-based feature, are to:
      determine the feature health status for the cloud-based feature based on the other service health status for the resource service.

12. The microservice monitoring platform of claim 7, wherein the one or more processors, when determining the feature health status for the cloud-based feature, are to:
   determine a respective service health status for one or more other microservices that are used by the cloud-based feature, and
   determine the feature health status for the cloud-based feature based the respective service health status for the one or more other microservices.

13. A non-transitory computer-readable medium storing instructions, the instructions comprising:
   one or more instructions that, when executed by one or more processors of a microservice monitoring platform, cause the one or more processors to:
      determine a service health status for a microservice based on a service type associated with the microservice,
         wherein the microservice is hosted in a first cloud computing environment by a first data center,
         wherein the service type comprises an internal microservice type, and
         wherein the one or more instructions, that cause the one or more processors to determine the service health status for the microservice, cause the one or more processors to:
            identify one or more health metrics that are associated with the microservice,
            determine, for each health metric of the one or more health metrics, a respective metric value,
            determine whether the respective metric value, for each health metric of the one or more health metrics, satisfies a metric value threshold,
            identify one or more dependent microservices,
               wherein the microservice uses the one or more dependent microservices,
            determine a dependent service health status for each dependent microservice of the one or more dependent microservices, and
            determine the service health status for the microservice based on determining whether the respective metric value, for each health metric of the one or more health metrics, satisfies the metric value threshold and based on the dependent service health status for each dependent microservice of the one or more dependent microservices,
               wherein the microservice is determined to be unavailable if one of the one or more dependent microservices is determined to be critical and unavailable;

determine a feature health status for a cloud-based feature based on the service health status for a plurality of microservices,
wherein the plurality of microservices are used by the cloud-based feature,
wherein the cloud-based feature is hosted in the first cloud computing environment by the first data center, and
wherein the cloud-based feature is based on the one or more dependent services;
transmit, to a client device, information identifying service health statuses for the plurality of microservices and information identifying the feature health status for the cloud-based feature,
wherein the service health statuses for the plurality of microservices are displayable based on at least one of:
a region of a respective microservice,
a category of a respective microservice, or
a type of a respective microservice; and
transmit, based on the feature health status, an instruction to route a service request, associated with the cloud-based feature, to one of:
the first data center, or
a second data center that hosts the cloud-based feature in a second cloud computing environment.

14. The non-transitory computer-readable medium of claim 13, wherein the one or more instructions, that cause the one or more processors to transmit the instruction to route the service request, cause the one or more processors to:
transmit the instruction to the first data center based on determining that the feature health status indicates that the cloud-based feature hosted in the first cloud computing environment is up, or
transmit the instruction to the second data center based on determining that the feature health status associated with the cloud-based feature indicates that the microservice hosted in the first cloud computing environment is down.

15. The non-transitory computer-readable medium of claim 13, wherein the service type is included in a plurality of service types,
wherein the plurality of service types comprises:
the internal microservice type that is associated with a first set of microservices that is hosted in the first cloud computing environment;
an external microservice type that is associated with a second set of microservices that is hosted outside of the first cloud computing environment; and
a resource service type that is associated with a set of services that is used by the microservice monitoring platform to monitor at least one of:
the first set of microservices, or
the second set of microservices.

16. The non-transitory computer-readable medium of claim 13, wherein the one or more instructions, when executed by the one or more processors, further cause the one or more processors to:
determine another service health status for another microservice,
wherein the other microservice is associated with another service type that comprises an external microservice type,
wherein the other microservice is used by the cloud-based feature, and
wherein the one or more instructions, that cause the one or more processors to determine the other service health status for the other microservice, cause the one or more processors:
attempt to establish a socket connection with the other microservice,
perform a ping test for the other microservice based on determining that the attempt to establish the socket connection with the other microservice was unsuccessful, and
determine the other service health status for the other microservice based on whether the ping test is successful; and
wherein the one or more instructions, that cause the one or more processors to determine the feature health status for the cloud-based feature, cause the one or more processors to:
determine the feature health status for the cloud-based feature based on the other service health status for the other microservice.

17. The non-transitory computer-readable medium of claim 13, wherein the one or more instructions, when executed by the one or more processors, further cause the one or more processors to:
determine another service health status for a resource service,
wherein the resource service is associated with a resource service type,
wherein the resource service type is associated with a set of services that is used by the microservice monitoring platform to monitor the plurality of microservices,
wherein the resource service includes one of:
a database service, or
a messaging service, and
wherein the one or more instructions, that cause the one or more processors to determine the other service health status for the resource service, cause the one or more processors to at least one of:
attempt, if the resource service is the database service, a test query the resource service, or
transmit, if the resource service is the messaging service, a test message using the resource service; and
wherein the one or more instructions, that cause the one or more processors to determine the feature health status for the cloud-based feature, cause the one or more processors to:
determine the feature health status for the cloud-based feature based on the other service health status for the resource service.

18. The method of claim 1, wherein the one or more health metrics that are associated with the microservice include at least one of:
a latency associated with the microservice,
an availability of the microservice, or
one or more error rates associated with the microservice.

19. The microservice monitoring platform of claim 7, wherein the one or more health metrics that are associated with the microservice include at least one of:
a latency associated with the microservice,
an availability of the microservice, or
one or more error rates associated with the microservice.

20. The non-transitory computer-readable medium of claim 13, wherein the one or more health metrics that are associated with the microservice include at least one of:
   a latency associated with the microservice,
   an availability of the microservice, or
   one or more error rates associated with the microservice.

\* \* \* \* \*